(12) United States Patent
Lopez et al.

(10) Patent No.: US 7,783,523 B2
(45) Date of Patent: *Aug. 24, 2010

(54) AUTOMATED PRICING SYSTEM

(75) Inventors: Douglas D. Lopez, Los Alamitos, CA (US); Robert L. Klug, Laguna Beach, CA (US)

(73) Assignee: California Distribution Center, Inc., Signal Hill, CA (US)

( * ) Notice: Subject to any disclaimer, the term of this patent is extended or adjusted under 35 U.S.C. 154(b) by 200 days.

This patent is subject to a terminal disclaimer.

(21) Appl. No.: 12/004,187

(22) Filed: Dec. 20, 2007

(65) Prior Publication Data

US 2008/0167971 A1 Jul. 10, 2008

Related U.S. Application Data

(63) Continuation-in-part of application No. 10/346,989, filed on Jan. 17, 2003, now Pat. No. 7,337,151.

(51) Int. Cl.
*G06Q 99/00* (2006.01)
(52) U.S. Cl. ............... 705/26; 705/1.1; 705/8; 705/28; 705/37; 705/400; 715/502; 715/513; 703/1; 700/97
(58) Field of Classification Search ....... 705/1, 705/7, 400, 8, 28, 37; 700/95, 97; 703/1; 715/502, 513
See application file for complete search history.

(56) References Cited

U.S. PATENT DOCUMENTS

| | | | |
|---|---|---|---|
| 5,189,606 A | 2/1993 | Burns et al. | 364/401 |
| 5,307,261 A | 4/1994 | Maki et al. | 364/401 |
| 5,570,292 A | 10/1996 | Abraham et al. | 364/473.01 |
| 5,761,674 A * | 6/1998 | Ito | 1/1 |

(Continued)

FOREIGN PATENT DOCUMENTS

JP 2001/357075 A 12/2001

(Continued)

OTHER PUBLICATIONS

"Timberline CAD Integrator Uses IFC Standard to Create Cost Estimates Directly From CAD Designs in Record Time", Mar 4, 2002, 10.aeccafe.com, 2 pgs.*

(Continued)

*Primary Examiner*—John W Hayes
*Assistant Examiner*—Freda A Nelson
(74) *Attorney, Agent, or Firm*—Roberta L. Hastreiter; Locke, Lord, Bissell & Liddell LLP

(57) ABSTRACT

A method and system for a rapid and automated creation of a price schedule comprising steps and an implementation for providing a set of construction plans created with an architectural software design tool, such as CAD, and a palette of 2-dimensional and/or 3-dimensional architectural parametric symbols that correspond to respective construction plan elements, such as windows, doors, acrylic glass blocks and/or sky lights. At least one parametric symbol corresponding to a construction plan element is inserted into the construction plans. A cost value for each of the inserted parametric symbols is calculated corresponding to respective plan elements. A price schedule is then created which includes the total cost for all of the inserted parametric symbols corresponding to respective plan elements.

52 Claims, 34 Drawing Sheets

U.S. PATENT DOCUMENTS

| | | | |
|---|---|---|---|
| 5,893,082 A * | 4/1999 | McCormick | 705/400 |
| 5,918,219 A | 6/1999 | Isherwood | 705/37 |
| 6,002,855 A | 12/1999 | Ladner et al. | 395/500.01 |
| 6,037,945 A * | 3/2000 | Loveland | 345/420 |
| 6,038,547 A | 3/2000 | Casto | 705/30 |
| 6,324,508 B1 | 11/2001 | Finney | 704/246 |
| 6,393,410 B1 * | 5/2002 | Thompson | 705/37 |
| 6,446,035 B1 * | 9/2002 | Grefenstette et al. | 704/1 |
| 6,446,053 B1 | 9/2002 | Elliott | 705/400 |
| 6,581,040 B1 * | 6/2003 | Wright et al. | 705/8 |
| 6,681,140 B1 * | 1/2004 | Heil | 700/95 |
| 6,810,401 B1 * | 10/2004 | Thompson et al. | 707/101 |
| 6,826,516 B1 | 11/2004 | Ito | 703/1 |
| 6,854,218 B2 | 2/2005 | Weiss | 52/79.1 |
| 6,859,768 B1 * | 2/2005 | Wakelam et al. | 703/1 |
| 7,283,975 B2 * | 10/2007 | Broughton | 705/28 |
| 7,337,151 B2 | 2/2008 | Lopez et al. | |
| 2001/0047250 A1 | 11/2001 | Schuller et al. | |
| 2001/0047251 A1 | 11/2001 | Kemp | |
| 2002/0016725 A1 * | 2/2002 | Eichstaedt et al. | 705/7 |
| 2002/0026343 A1 | 2/2002 | Duenke | |
| 2002/0035408 A1 * | 3/2002 | Smith | 700/97 |
| 2002/0099617 A1 | 7/2002 | Fogelson | |
| 2002/0103557 A1 | 8/2002 | Land | |
| 2003/0050871 A1 | 3/2003 | Broughton | |
| 2003/0097240 A1 | 5/2003 | Atasoy | |
| 2003/1399995 | 7/2003 | Farley | |
| 2004/0049739 A1 * | 3/2004 | McArdle et al. | 715/513 |
| 2004/0143424 A1 | 7/2004 | Lopez et al. | |
| 2004/0205519 A1 * | 10/2004 | Chapel et al. | 715/502 |
| 2005/0038636 A1 | 2/2005 | Wakelam et al. | |
| 2006/0277007 A1 | 12/2006 | Wakelam et al. | |
| 2008/0077364 A1 | 3/2008 | Wakelam et al. | |

FOREIGN PATENT DOCUMENTS

| | | |
|---|---|---|
| JP | 2004062601 A * | 2/2004 |
| WO | WO 01/08269 A2 | 1/2001 |
| WO | WO 01/29634 A2 | 4/2001 |
| WO | WO 01/55831 A1 | 8/2001 |
| WO | WO 01/67372 A1 | 9/2001 |
| WO | WO 01/88740 A1 | 11/2001 |
| WO | WO 02/13108 A1 | 2/2002 |
| WO | WO 02/29518 A2 | 4/2002 |
| WO | WO 02/070989 | 9/2002 |
| WO | WO 03/062957 | 7/2003 |

OTHER PUBLICATIONS

Swanson, John. G., "E Business Evolving Rapidly", Mar. 2001, Window and Door, 6 pgs.*

California Distributor Selling Windows on Line, Sep. 2000, Window and Door, 2 pgs.*

Goldberh, H. Edward, "BIM Update 2006—How Complete is the Building Information Model?", Nov. 2006, Cadalysts, vol. 23, No. 11, p. 50.*

John G. Swanson, "E. Business Evolving Rapidly," Mar. 2001, Window & Door, 8 pages.

"California Distributor Selling Windows On Line," Sep. 2000, Window & Door, 2 pages.

Activewin.com.

EPIC Electronic Product Information Corp., Product Brochures, Apr. 1997.

EPIC Product Information Corp., Technology, Software Brochure, May 1992.

EPIC Electronic Product Information Corp., Quick Reference Technology Demo, Mar. 1995.

Edgenet Media, Made 2 Order, Bruchure, Rev. Jul. 28, 1998.

* cited by examiner

| Name | Library | Description | Full path ▲ |
|---|---|---|---|
| Peak Rake | Window | No description | C:\Program |
| Picture Window | Window | No description | C:\Program |
| Right Facing Quarter Ro... | Window | No description | C:\Program |

← Details Column Controls

FIG. 4

Symbol Dragged from list to Drawing

Project ZipCode

1st Pricing ID

New Registration

*FIG. 14*

| 1stWindows Registration | | | | |
|---|---|---|---|---|
| First Name | * Never | Last Name | * | Nobody |
| Company Name | Nonesuch | User Name | * | user1 |
| Address | 1 Neverland Place | City | | Neverwhere |
| State | California | Postal Code | | 90909 |
| Phone | 4154794571 | Fax | | none |
| Email | * NoSuchPerson@None.com | | | |

☑ Email me information about 1stpricing/1stwindows.com updates and special offers.

* Indicates a Mandatory Field    [ OK ]   [ Cancel ]

FIG. 15

Your only a few steps away from accessing 1stpricing/1stwindows.com new quoting features including Quote Storage, Multiple Quotes, Password Protection, Customizing Bidding and much more! It's easy, fast and free. To sign up, simply fill out the following form below and click "Submit" when your are finished.

Personal Profile          * Indicates a Mandatory Field

First Name: *
Last Name: *
User Name: *                            ← You will use this information to login to your 1stpricing/1stwindows.com account. Your password must be at least 4 characters long and should be different than your username. Remember that the password is case sensitive.
Password: *
Re-Type Password: *

UserID

Type of Account: *  ⦿ Contractor    ○ Architect    ○ Consumer
Company Name: *
Contractors License:
(If your state requires one)
Address:
City:
State: * [Alabama ▼]

*FIG. 18*

☑ <u>E</u>nable this session

<u>U</u>pdate

<u>V</u>iew Schedule

*FIG. 19*

```
                    ORDER AT http://www.1stwindows.com
                              Reference Number: 6519035
    +------------------------------------+------------------+
    |           windows and Doors                           |
    +------------------------------------+------------------+
    |             Glass                  |    1stPricing    |
    +--------+-----+-----+-------+-------+----+-------------+
    |Tempered|Tubes|Glass|Glazing|Remarks|Qty| 1stwindows  |
    +--------+-----+-----+-------+-------+----+-------------+
    |  NO    | NO  |Clear|  DG   |       |   |   n/a       |
    |  NO    | NO  |Clear|  DG   |       |   |  $228.23    |
    |  NO    | NO  |Clear|  DG   |       |   |  $228.23    |
    |  NO    | NO  |Clear|  DG   |       |   |  $205.41    |
    |  NO    | NO  |Clear|  DG   |       |   |  $205.41    |
    |  NO    | NO  |Clear|  DG   |       |   |   n/a       |
    |  NO    | NO  |Clear|  DG   |       |   |   n/a       |
    |  NO    | NO  |Clear|  DG   |       |   |   n/a       |
    |  NO    | NO  |Clear|  DG   |       |   | $1,323.42   |
    |  NO    | NO  |Clear|  DG   |       |   |  $739.62    |
    |  NO    | NO  |Clear|  DG   |       |   |  $739.62    |
    |  NO    | NO  |Clear|  DG   |       |   |   n/a       |
    |  NO    | NO  |Clear|  DG   |       |   |   n/a       |
    |  NO    | NO  |Clear|  DG   |       |   |   n/a       |
    |  NO    | NO  |Clear|  DG   |       |   |  $607.20    |
    +--------+-----+-----+-------+-------+----+-------------+
                                          TOTAL |$4,277.26 |
    +-------------------------------------------------------+
```

Reference Number

1stPricing Column

Total

*FIG. 21*

Reference Number: 6519035

Select window and door manufacture:

⦿ 1stWindows $4,277.26

◯ None

Account Name
tester
Log Out

Change Quote
View Quote
Alter Quote
View All Quotes
Create New Quote
Compare Prices
Prepare a Quote

Current Quote

Name: 1stPricing Reference #6519035

State: California
Change State

Number of Items: 4

Total: $1074.13

Check Out Process

Payment Information

Method of Payment:
- ● American Express
- ○ Discover
- ○ Mastercard
- ○ Pay on account
- ○ Pay over the phone
- ○ Visa ◄ Check out process Card Holder's Name: _____
Credit Card Number: _____
Expiration Month: Jan ▼    Expiration Year: 2007 ▼

☐ To complete your purchase you must check this box to signify that you have read and accept the following:

Terms and Conditions of Sale

All sales are final. Your credit card will be processed at the time of the order.

"ARBITRATION OF DISPUTES
Any controversy or claim arising out of or relating to this contract or breach thereof shall be settled by arbitration in accordance with the Uniform Rules for Better Business Bureau Arbitration, and the judgment upon the award rendered by the arbitrator's may be entered in any court having Jurisdiction thereof."

[Next Page]

*FIG. 31*

Check Out Process

Ship To:
Window Buyer
1858 East 20th Street

Signal Hill, CA, US
Phone: 562-494-3680  Fax:
Cell:  Pager:

Bill To:
Window Buyer
1858 East 20th Street

Signal Hill, CA, US
Phone: 562-494-3680  Fax:
Cell:  Pager:

| Product | Quantity | Unit | Total |
|---|---|---|---|
| Milgard Tuscany Vinyl Half Vent Sliding Window | 1 | $123.98 | $123.98 |

Rough Opening
Type: XO
Size: 22" x 14"
Frame Type: Nail On
Frame Color: White
Grid Pattern: None
Glass Type: Clear
Low E: Yes
Tempered: No ← Check out process Sub-Total  $123.98
Shipping  $55.00
Tax  $14.77
Total  $193.75

Billing Information: Card Type: Pay over phone
Expiration: 2 / 2008

A confirmation email will be sent to buyer@windows.com

If this information is correct, click on the 'Submit Order' button
Otherwise, click the 'Change Fields' button to go back to make the necessary changes.

[ Submit Order ]     [ Change Fields ]

TAX: All purchases within California will be subject to a sales tax of 8.25%. For all purchases outside of
California, the contractor is required to pay all local and state taxes.

*FIG. 32*

Thank You for your order

A confirmation email has been sent to you.

For reference your order number is TS9G7D

Click Here to Continue Shopping

Back

AUTOMATED PRICING SYSTEM

This application is a continuation-in-part patent application of pending non-provisional patent application U.S. Ser. No. 10/346,989, filed on Jan. 17, 2003, now U.S. Pat. No. 7,337,151. This continuation-in-part patent application claims the benefit of prior non-provisional patent application U.S. Ser. No. 10/346,989, filed on Jan. 17, 2003, which patent application is hereby incorporated into this continuation-in-part patent application in its entirety by reference.

BACKGROUND OF THE INVENTION

1. Field of the Invention

N/A

2. Background

In a typical construction design, a set of construction plan drawings are generated, usually with a computer-implemented tool, such as an architectural CAD (Computer Aided Design) software product. Disadvantageously, the various elements and materials of the construction project, for example, windows, doors, skylights, acrylic glass blocks and the like, are priced out in estimating the cost of the job in a completely separate process, and usually only by one manufacturer. This separate process very disadvantageously adds a significant amount of time and effort to the process of generating a construction job price. Also very disadvantageously, because different construction materials of varying quality and cost can generally be used on the same construction job or project, the cost amounts that are set forth on a price schedule that is generated by this separate process can vary by a very wide margin. Further, and also disadvantageously, in the event that the price schedule needs to be changed, for example, due to cost overruns, competitive bidding and/or other factors, a new price schedule must be generated, with an additional significant investment of time and effort involved for each such revision. Again, this ads a significant amount of extra expense to a construction project, and this typical process limits the flexibility in selected various construction materials for contractors and end-use customers.

It is important to provide a price, rather than an estimate, for a proposed construction project. In order for a bank (or other lending institution) to approve a construction loan for a proposed construction project, the bank generally requires an accurate price for the construction project, and will not rely upon an estimate, because estimates are often extremely inaccurate. If a bank does accept an estimate, and the estimate turns out to be lower than the final price for the construction project, the bank, which has control in such a situation, may then additionally charge large points and/or fees for the construction loan, substantially raising the price of the construction project, which is very undesirable. If the estimate turns out to be lower than the final price, this often results in construction cost overruns, construction time delays and dissatisfaction of customers.

Most of the time when architectural plans are drawn, the plans are drawn inaccurately. If an architectural plan is drawn inaccurately, and a price is provided for a corresponding construction project, this situation generally presents significant problems with respect to construction cost overruns, construction time delays and the satisfaction of customers (homeowners or building owners).

It was a goal of the present invention to solve the above-described problems.

3. Description of the Art

Wakelam et al. (U.S. Pat. No. 6,859,768 B1) describe a computer-implemented automated building design and modeling system ("DMES system") that includes a database (column 4, lines 30-32) that provides a central source for all design and construction information for a construction project (abstract, column 1, lines 57-67, and claim 1). Ordinary elements and massing elements are assembled into a building model according to a sequential assembly hierarchy, "thus assembling a complete building model automatically . . . " (abstract and claim 11). Software for a commercially-available "cost estimating system" (represented as 112 in the figures), as well as software for several other systems that may be employed in a network implementation of the DMES system, is stored on a hard drive of a computer (FIG. 1 and column 7, lines 45-62). The "cost estimating system" produces a cost estimate (not a price), which is implemented using Ice 2000 computer software.

In contrast with the present invention, Wakelam et al. do not describe the production of a "price quote" or a "price schedule." It is clear from a detailed review of Wakelam et al. that the systems and processes described therein only produce an estimate (a "cost estimate"), which is for a production of an entire building. (See, for example, FIG. 2g, 2h, 2i, 2j, 2k and 6b, the abstract, Appendix A, and column 1, lines 51-54, column 3, lines 42-46, column 7, lines 37-43, column 9, lines 8-31, and the claims of Wakelam et al.).

The "cost estimating system" that is described by Wakelam et al. for producing cost estimates is one of several different systems that are implemented with the DMES system described therein, and is a known computer software named "Ice 2000" that is commercially available from $MC^2$ Management Computer Controls, Inc., and described on the $MC^2$ Management Computer Controls, Inc. mc2-ice web site (column 7, lines 55-58).

Also, in contrast with the present invention, Wakelam et al. does not describe an ability to determine a price quote or price schedule for only one or two construction plan elements, such as only a window, or only a window and a door. It is clear from a detailed review of Wakelam et al. (including FIGS. 1-6) that the processes and systems that are described therein only provide a "cost estimate" (only a "ball park" figure regarding what the actual cost of designing and building a building may be) for the production of an entire building (i.e., not for individual construction products, such as a window, a door, an acrylic glass block, a sky light or the like). The cost estimate for the entire building includes cost estimate data for a wide variety of materials, components and labor, such as electrical devices, equipment and wiring, lights, HVAC systems, elevators, and man hours of labor involved in the fabrication of the building, as well as construction products, such as windows and doors.

As a result of the above difference, the methods and systems of the present invention are advantageously much more versatile than the methods and systems that are described by Wakelam et al. For example, the present invention can be employed in small or large residential or commercial remodeling construction projects, as well as for constructing entire new residential or commercial buildings. In contrast, the methods and systems described by Wakelam et al. can only be used for the construction of an entire new building.

Also in contrast with the present invention, Wakelam et al. does not describe a process or system having a plug-in (add-on) computer software code that runs as an internal component within a software design tool on a local computer, such as architectural CAD, but rather uses a stand alone, interview-based system, and a commercially available cost estimation software named Ice 2000. It is clear from a detailed review of Wakelam et al. that the processes and systems that are described therein are stand-alone processes and systems that can work in a network along with the DMES system.

Moreover, Wakelam et al., which describe a very complicated system that is employed to construct an entire building using a series of multiple tiers and hierarchies, teach away from the use of architectural CAD (a software design tool) by stating the following at Column 4, Lines 38-59, and Column 18, Lines 7-23, respectively:

" . . . In contrast to a conventional CAD tool, which uses software algorithms that scan and sort the locations and extents of all three-dimensional primitive geometries in a building model and compares all of the locations thereof for potential overlaps, the DMES system of the present invention performs clash detection, or interference checking, by cross-checking the location and extents of a current instance of an object against only those other existing instances in the model, i.e., the spatial database, and adjusting its position if necessary before assembling it into the model. This automatic clash detection is part of the assembly code included in each massing element and each element uses its own specific functions to determine the parameters of a clash and the rules by which to reposition the instance. This process has a small incremental impact on the speed of the assembly process, but completely removes the need for a series of long clash detection exercises after the model is complete."

" . . . In contrast to a conventional CAD tool, which uses software algorithms that scan and sort the locations and extents of all three-dimensional primitive geometries in a building model and compares all of the locations thereof for potential overlaps, the DMES system of the present invention performs clash detection, or interference checking, by cross checking the location and extents of the current instance against only those other existing instances in the model and adjusting its position if necessary before assembling it into the model. This automatic clash detection is part of the assembly process in each massing element and each element uses its own specific functions to determine the parameters of a clash and the rules by which to reposition the instance. This process has a small incremental impact on the speed of the assembly process, but completely removes the need for a series of long clash detection exercises after the model is complete."

Further, in contrast with the present invention, Wakelam et al. does not describe a process or system that employs a zip code of a construction site to access price data from a web site on a remote server system. Wakelam et al. does not describe a process or system that employs a web site that includes price data for a purchase of one or more construction plan elements in a geographical location within a zip code. Further, in contrast with the "cost estimates" described by Wakelam et al., the price data described herein can be relied upon to purchase one or more construction plan elements.

In contrast with the processes and systems of the invention, the processes and systems that are described by Wakelam et al. are very complicated (perhaps because an entire building is being assembled), and include an assembly hierarchy having five or more tiers.

Further, Wakelam et al. do not describe: (a) an insertion of a price schedule into a construction plan; (b) a price schedule that contains a list of construction plan elements with corresponding price quotes; (c) a placing of an order to purchase one or more construction plan elements; (d) a placing of an order to purchase one or more construction plan elements using a local computer or a web site on a remote server, or both; (e) a placing of an order to purchase one or more construction plan elements using a credit card and a local computer or a web site on a remote server, or both; or (f) a creation of a price schedule including one or two construction plan elements.

U.S. Pat. No. 6,446,053 B1 (Elliott) describes a computer-implemented method and system for producing a proposal for a construction project (title). The system includes a central site with various databases and a user site connected for electronic communication over a networked communication system such as the Internet (abstract). The user site includes a computer having stored in memory an application that enables a user to develop a construction proposal including a detailed graphical model and a detailed cost estimate model, have the proposal submitted electronically over a networked communication system to a construction professional for a bid, and receive a response on the proposal from the construction professional over the networked communications system (abstract). The application educates the user as it guides the user through a series of construction phases and steps, prompting the user to input critical information and make appropriate selections throughout the series of phases and steps (abstract). The method and system provide a proposal and a cost "estimate," not a final price (abstract).

In contrast with the methods and systems of the present invention, Elliott: (1) does not employ a plug-in (add-on) computer software code that runs as an internal component within a software design tool on a local computer, such as architectural CAD (but rather uses a stand alone, interview-based system); (2) does not insert parametric symbols into a construction plan; (3) does not, using an add-on computer software code, transmit data corresponding to inserted parametric symbols from a local computer over the Internet to a remote server system; (4) use a zip code and an add-on computer software code to access price data from a web site on a remote server system; or (5) determine from price data a price quote for each of several construction elements, but rather provides only a cost estimate.

Both Wakelam et al. and Elliott use stand alone computer software for cost estimation that does not include an add-on (plug-in) computer software code. Wakelam et al. uses commercially available Ice 2000 (column 7, lines 55-58), and Elliott uses a software package (not named) that is "preferably installed on the hard disc of a user's computer" (column 5, lines 25-27).

Further, Elliott does not teach or suggest the creation of a construction plan using a software design tool, such as architectural CAD. In contrast, Elliott describes (col. 6, lines 43-50, and col. 10, lines 20-24) the scanning of a photograph or construction plan into a user's computer to produce a digital image, which is a completely different process.

Additionally, the systems of both Wakelam et al. and Elliott provide only an "estimate" for the products described therein, and not a final price. This is a very important distinction between the present invention and the teachings of Wakelam et al. and Elliott. For the reasons that follow, it is important to obtain a price, rather than an estimate. Generally, lending institutions will not rely upon an "estimate" when considering whether or not to make a construction loan because estimates are often extremely inaccurate, and such inaccuracy often results in large construction cost overruns and significant construction time delays. Further, a price is binding upon the person or entity that provides the price, whereas an estimate does not bind a person or entity to a particular price. Therefore, a person or entity that provides a price must honor their price (or may be sued for not doing so), even if the construction job for which the price was quoted ends up costing significantly more money than the price quoted, causing the person or entity that quoted the price to lose a significant amount of money. This is not true of an estimate, which does not bind a person or entity to a particular price. As can be seen, it is significantly more risky to provide a price in comparison with an estimate, which is the reason why contractors generally only provide estimates (i.e., they do not want to be bound to a particular price). Further, it is a much more complex process to provide a price (an assigned amount of money that is required to be paid in order to make a purchase) in comparison with an estimate (a rough calculation). Elliott itself acknowledges this fact by stating, "Calculating the material quantities and costs [of large construction projects] can be very complicated" (column 1, lines 25-26).

Moreover, neither Wakelam et al. nor Elliott teach or suggest the use of a zip code to determine price data for one or more construction plan elements. Although Elliott discusses zip codes, such discussion only relates to the average labor rate, the average price of land, the average cost of builder's risk insurance and building permit costs, not to construction plan elements (col. 4, lines 44-62). The foregoing items are completely different from construction plan elements, and the pricing of the foregoing items would be completely different from the pricing of construction plan elements.

In contrast with the present invention, neither Wakelam et al. nor Elliott teach or suggest any of the following:

(1) inserting a price schedule into a construction plan;

(2) a price schedule that contains a list of construction plan elements with corresponding price quotes;

(3) the use of a CAD (Computer Aided Design) software product to create a construction plan;

(4) an add-on computer software code that imbeds a price schedule into a construction plan;

(5) the creation of a price schedule that includes one or two construction plan elements; or (6) a plug-in (add-on) computer software code and a web site that permit a user to place an order to purchase one or more of the construction plan elements that are present in a price schedule.

U.S. Pat. No. 6,810,401 B2 (Thompson et al.) describes an automated configuration system (and method) for facilitating the configuration of desired products, services, or other assemblages that require users to gather and assimilate disparate knowledge of makes, models, types, features, codes, and prices of the desired product/service to be configured (abstract). In accordance with a preferred embodiment, configuration is facilitated through interaction of a user with a frame engine that performs frame-based inferences to discern stored knowledge of a product (or the like), as supplemented by a rules-based inference system (column 1, lines 30-34).

In contrast with the methods and systems of the present invention, Thompson et al. describe a configuration system that does not use a plug-in (add-on) computer software code that runs as an internal component within a software design tool on a local computer, such as architectural CAD. Further, a construction product, such as a window or door, cannot be drawn in architectural CAD using the Thompson et al. system because the Thompson et al. system does not work in architectural CAD. In contrast, a construction product may only be cut and pasted into architectural CAD (in the same manner that a picture can be cut and pasted into a Word document). The configuration system of Thompson et al. is just drawing a picture on a computer. Moreover, the Thompson et al. system can only provide a price for one type of a construction product, such as a window, at a time, and provides a very slow process for providing such price. For example, in contrast with the methods and systems of the present invention, the system of Thompson et al. cannot provide a price for both a window and a door at the same time, or using the same computer software. Very disadvantageously, the Thompson et al. system must use a different type of software for each different type of construction product, for example, four different softwares for a window, a door, an acrylic glass block and a sky light, which is very time consuming and expensive.

In contrast with the Thompson et al. system, the system of the present invention uses a plug-in (add-on) computer software code that runs as an internal component within a software design tool on a local computer, such as architectural CAD. A product, such as a bay window, can be drawn in architectural CAD, and may then be imbedded into a wall of a room or structure, such as a Great Room. The window gets sized, and then is "burned" into a wall, so that one can clearly see exactly what the window will look like when it is added to the room and embedded into the wall. The "burning" of the window into the wall is a function of the plug-in (add-on) computer software code that runs as an internal component within the architectural CAD program. The system that is described by Thompson et al. does not do this. Such system is not working in architectural CAD. Further, with the system of the present invention, changes may be made to the window (while embedded into the wall in a room), and the changes to the window can then be clearly viewed (while the window is embedded into the wall in a room). This system can provide a price (a final price, and not an estimate) very rapidly for one or more different types of construction or other products, which is "tricky" (i.e., not easily accomplished). With the methods and systems of the present invention, it is possible to obtain a price for a construction product, such as a window or door, from as many as fifteen or more different manufacturers at the same time. Further, the present invention uses a zip code to obtain, and provide, price data for the purchase of one or more construction products, which includes a subtotal, tax and a final price. Very advantageously, the construction products can be purchased the same day (i.e. immediately).

None of Thompson et al., Wakelam et al. or Elliott teach or suggest any of the following steps, elements or limitations of the methods and systems of the present invention:

(1) using an add-on (plug-in) computer software code that runs as an internal component within a software design tool on a local computer;

(2) an insertion of parametric symbols in to a construction plan;

(3) using the add-on computer software code, transmitting data corresponding to each inserted parametric symbol from a local computer over the Internet to a remote server system;

(4) using a zip code and an add-on computer software code to access price data from a web site on a remote server system; or (5) creating a price schedule from price quotes.

Further, Thompson et al. does not teach or suggest: (1) providing a construction plan on a local computer; (2) creating a construction plan with a software design tool; or (3) providing on a local computer a palette that includes at least one parametric symbol.

The products that are described by Thompson et al. cannot be drawn in an architectural CAD (or other) software design tool. In contrast, they may only be assembled in such a tool by an architect (a different user with a different computer). With the use of human intervention (i.e. no automation), drawings that are created by the Thompson et al. system can be sent or exported to an architect, for example, using e-mail, and the architect can then cut and paste the drawings into an architectural CAD program that the architect is using. The Thompson et al. system merely allows one to cut and paste drawings of products into a CAD program. For example, a window could be drawn in Microsoft Word using its drawing tools, and such drawing could be considered to be a CAD drawing because it is a "computer assisted drawing" (i.e., a computer assists a user in drawing the window). Further, the drawing could be e-mailed to an architect to be inserted into an architectural CAD program. However, in contrast with the methods and systems of the present invention, the user is not working in an architectural CAD program, and the drawing is not an add-on to an architectural CAD program.

In contrast with the above, the methods and systems of the present invention perform one or more sets of operations in a software design tool, such as architectural CAD, using an add-on (plug-in) computer software program. With this invention, no human intervention is required or desired (i.e., it is automated), and drawings can be "burned" (inserted) into a construction plan that has been designed using an architectural CAD program (or other software design tool).

Further, the Thompson et al. system can only be employed with one single product type, such as a window, whereas the methods and systems of the present invention can draw and price multiple different projects, such as a window, a door and an acrylic glass block, and rapidly provide comparison pricing for the various products from multiple different manufacturers.

Moreover, like Wakelam et al. and Elliott, Thompson et al. does not teach or suggest the use of a zip code to determine price data for one or more construction plan elements. Additionally, Thompson et al. do not teach or suggest:

(1) placing an order to purchase one or more of the construction plan elements that are present in a price schedule (because no price schedule is created by Thompson et al.); or (2) a system wherein an add-on (plug-in) computer software code and a web site permit a user to place an order to purchase one or more construction plan elements.

U.S. Patent Application Publication No. 2001/0047250 A1 (Schuller et al.) describes a computer-implemented method of visualizing a decorating project (abstract). The method includes rendering an image of a building space (e.g., a room) that includes a number of structural objects (such as doors, walls, and furniture) (abstract). The structural objects may be portrayed in the rendered image with visual characteristics that are determined by decorative materials (such as paint, fabric, or wallpaper) associated with the objects (abstract). Schuller et al. also describe a computer-implemented decorating system that includes a server operatively coupled to a memory, a database, and a network over which data can be exchanged with client computers (abstract). The memory includes software instructions to configure the server to retrieve modeling software from the database in response to requests from client computers, and to send the modeling software over the network to the client computers (abstract). The modeling software includes instructions to configure the client computers to model structural objects, to associate decorative materials with the structural objects, and to render an image of a building space (abstract). The rendered image portrays structural objects in accordance with visual characteristic of associated decorative materials (abstract).

In contrast with the methods and systems of the present invention, the decorating system of Schuller et al.: (1) does not employ a plug-in (add-on) computer software code that runs as an internal component within a software design tool on a local computer, such as architectural CAD but, rather, uses a stand alone computer program; and (2) does not employ a zip code to provide any prices. Although Schuller et al. state that their implementations can include automated purchasing [of structural objects and decorative materials], Schuller et al. do not describe how this may be accomplished.

None of Thompson et al., Wakelam et al., Elliott or Schuller et al. teach or suggest any of the following steps, elements or limitations of the present invention:

(1) using an add-on (plug-in) computer software code that runs as an internal component within a software design tool on a local computer;

(2) an insertion of parametric symbols into a construction plan;

(3) using the add-on computer software code, transmitting data corresponding to each inserted parametric symbol from a local computer over the Internet to a remote server system;

(4) using a zip code and an add-on computer software code to access price data from a web site on a remote server system; or (5) creating a price schedule from price quotes.

Additionally, Schuller et al. do not teach or suggest: (1) providing a construction plan on a local computer; (2) creating a construction plan with a software design tool; or (3) providing on a local computer a palette that includes at least one parametric symbol.

The teachings of Schuller et al. are clearly limited to the visualization of a decoration project (page 1, paragraphs [0006] and [0007]), and do not discuss construction projects.

Further, the "input images" that are discussed by Schuller et al. are obtained using a "digital image capture device," such as a scanner, digital camera or video signal capture device, and not a software design tool, such as CAD (page 1, paragraph [0009]).

The method and system of Schuller et al., which are drawn to the decoration of a room with, for example, paint, wallpaper and fabric (page 2, paragraphs [0023] and [0028]), are much simpler, and quite different, in comparison with the methods and systems of the present invention, which are drawn to construction projects, and the pricing of one or more construction elements. Such pricing is quite "tricky" (i.e., is not easily accomplished).

Like Wakelam et al., Elliott and Thompson et al., Schuller et al. do not teach or suggest the use of a zip code to determine price data for one or more construction plan elements.

While Schuller et al. do discuss an automatic purchasing of furnishings and decorating materials (page 5, paragraph [0049], page 7, paragraph [0067], and claims 11, 12, 29 and 30), Schuller et al. do not specify the mechanism that is employed to procure pricing for such purchasing. The teachings that are present in Schuller et al. regarding an automated purchasing are very vague.

Moreover, Schuller et al. do not teach or suggest the use of an add-on (plug-in) computer software code to a software design tool that permits a user to pay for an order using a credit card.

A need in the architectural and/or construction industries currently exists for rapidly, efficiently and cost-effectively generating, and modifying, a set of construction plans for one or more construction elements, and a corresponding price quote schedule for such construction elements, in one general process, wherein a user can rapidly procure one, two, three, four, five or more comparative prices from one, two, three, four, five or more different manufacturers, which may be competitors, to determine the "best" (most competitive) final price for the various construction elements that will be used in the set of construction plans.

SUMMARY OF THE INVENTION

Very advantageously, the present invention provides methods and systems for rapidly, efficiently and cost-effectively generating, and modifying, a set of residential or commercial construction plan drawings for one or more construction elements, and a corresponding price quote schedule for such construction elements, in one general process, wherein a user can rapidly procure one, two, three, four, five or more comparative prices from one, two, three, four, five or more different manufacturers, which may be competitors, to determine the "best" (most competitive) "real time" final price for the various construction elements that will be used in the set of construction plans.

The difficulties and drawbacks that are associated with the above-described systems are advantageously overcome by the present invention, which is a method and system for an automated creation of a price schedule for a construction project. The present invention comprises steps and an implementation for providing a set of one or more construction plan drawings created with a software design tool and a palette of architectural 2D and/or 3D parametric symbols corresponding to respective construction elements. At least one parametric symbol corresponding to each construction element is inserted into the construction plan drawings. A cost value for each of the inserted parametric symbols is calculated corresponding to respective construction elements. A price schedule is created including the total cost for all the inserted parametric symbols corresponding to respective construction elements, which can provide comparison pricing between two or more different manufacturers and/or distributors for the same construction element(s), for example, the pricing of a bay window for a kitchen having a variety of specified features (white in color, vinyl frame, Low E glass, Argon filled glass, a specified number of grids, corresponding grid patterns, etc.) from 1stWindows, Andersen Windows and Pella Corporation.

In one aspect, the present invention provides an automated method for creating a price schedule for one or more construction plan elements of a construction project comprising:
- (a) providing on a local computer an architectural software design tool and a construction plan drawing having at least one construction plan element, wherein the construction plan drawing is created with the architectural software design tool;
- (b) providing on the local computer an add-on computer software code that runs as an internal component within the architectural software design tool, and that includes a palette containing one or more parametric symbols, and optionally one or more corresponding parametric symbol values, wherein the palette includes a parametric symbol for each of the construction plan elements;
- (c) selecting one or more of the parametric symbols that is included in the palette for insertion into the construction plan drawing;
- (d) optionally, selecting one or more parametric symbol values for one or more of the selected parametric symbols;
- (e) optionally, selecting one or more types of manufacturers or distributors for one or more of the selected parametric symbols;
- (f) inserting one or more of the selected parametric symbols into the construction plan drawing;
- (g) using the add-on computer software code and an Internet connection, transmitting data corresponding to each of the inserted parametric symbols from the local computer to a remote server system;
- (h) using a zip code, the add-on computer software code and an Internet connection, accessing price data from a web site present on the remote server system that includes price data for a purchase of construction plan elements corresponding to inserted parametric symbols from one or more available manufacturers or distributors in a geographical location within the zip code;
- (i) determining from the price data a price for each of the construction plan elements corresponding to an inserted parametric symbol; and
- (j) using the add-on computer software code, creating a price schedule from the prices, wherein the price schedule includes a total cost for all of the construction plan elements corresponding to inserted parametric symbols, wherein the price schedule can include one or more construction plan elements, and wherein the price schedule may be immediately used on the local computer to place an order to purchase one or more construction plan elements that are present in the price schedule.

In another aspect, the present invention provides an automated system for creating a price schedule for one or more construction plan elements of a construction project comprising:
- (a) a local computer;
- (b) an architectural software design tool, wherein the architectural software design tool provides on the local computer a construction plan drawing having at least one construction plan element;
- (c) a remote server system having a web site that maintains a database including pricing data for the construction plan elements, wherein an Internet connection exists between the remote server system and the local computer; and
- (d) an add-on computer software code that runs as an internal component within the architectural software design tool on the local computer;

wherein the add-on computer software code has a palette that includes at least one parametric symbol that corresponds with each of the construction plan elements, and that may be selected by a user for insertion into the construction plan drawing; and wherein the add-on computer software code:
- (i) inserts at least one of the parametric symbols that are selected by a user into the construction plan drawing;
- (ii) transmits via the Internet connection data corresponding to each inserted parametric symbol from the local computer to the remote server system;
- (iii) receives via the Internet connection a price for the purchase of each of the construction plan elements corresponding to an inserted parametric symbol from the remote server system, wherein the price may be determined using a zip code and price data that is present on the web site on the remote server system, and corresponds with the purchase of the construction plan elements in a geographical location within the zip code; and
- (iv) generates a price schedule from the prices, wherein the price schedule includes a total cost for all of the construction plan elements corresponding to inserted parametric symbols, wherein the price schedule can include one or more construction plan elements, and wherein the price schedule can be immediately used on the local computer to place an order to purchase one or more construction plan elements that are present in the price schedule.

The methods and systems of the present invention are "revolutionary," and architects "love them." For example, the November 2006 issue of Cadalyst, an independent (non-biased) magazine containing numerous articles about CAD, includes an article (page 50, right column) that states, in part:

"1ST Pricing is the only product available that allows automatic product pricing and purchasing directly within AutoCAD, ArchiCAD and TurboCAD (FIG. 2). Its developer expects to soon introduce an Architectural desktop and Revit plug-in as well as Vectorworks integration. This patent-pending product automatically gives you five real-time quotes on doors and windows delivered to the job site based on zip code. Look forward to the ability to get realtime pricing updates for all components such as lumber packages." [Emphasis added.]

As will be realized, the present invention is capable of other and different embodiments, and its several details are capable of modifications in various respects, all without departing from the scope and spirit of the invention. Accordingly, the description and accompanying figures are to be regarded as illustrative and not restrictive.

BRIEF DESCRIPTION OF THE DRAWINGS

FIG. 4 shows parametric symbol details of the Parametric Symbol Palette illustrated in FIG. 3.

FIG. 14 depicts "Scheduler Controls" that are used with the Parametric Symbol Palette of the plug-in (add-on) computer software code of the present invention.

FIG. 15 depicts the "Registration" dialog that is opened in accordance with the plug-in (add-on) computer software code of the present invention when a user clicks the "Registration" scheduler control button.

FIG. 18 shows a registration page for registering a new user in accordance with the plug-in (add-on) computer software code of the present invention.

FIG. 19 shows "Scheduler Creation" controls in accordance with the plug-in (add-on) computer software code of the present invention that are used with the Parametric Symbol Palette of the present invention, which enable the creation, updating and viewing of a parametric symbol or price schedule, and which allow the plug-in (add-on) computer software code of the present invention to connect to the 1stPricing or 1stWindows dot com online database in accordance with the present invention to obtain pricing information for various construction elements.

FIG. 21 shows details of the parametric symbol schedule of FIG. 20.

FIG. 24 shows a dialog in the 1stPricing dot com or 1stWindows online database for allowing a user to indicate a type of manufacture in accordance with the present invention.

FIG. 26 shows a highlighted portion of the exemplary price quote of FIG. 25, and options that are available for each price quote (view quote, alter quote, view all quotes, create new quotes, compare prices, prepare a quote and the like).

FIG. 28 shows a comparison price quote generated by the 1stPricing dot com or 1stWindows dot com online database in accordance with the present invention when the user clicks on "Compare Prices" in the comparison pricing dialog that is shown in FIG. 26, with five different prices being shown for five different patio door manufacturers in connection with a vinyl sliding patio door having specified features and a specified size.

FIGS. 29-33 show various dialogs that are present in the 1stPricing dot com or 1stWindows dot com online database in connection with the check out process in accordance with the present invention after a price quote has been completed, and a user clicks a "Check Out" button.

FIG. 34 shows an export function of a generated price schedule in the 1stPricing dot com or 1stWindows dot com online database that permits the price schedule to be exported as a standalone object into a database in the form of various common computer applications or formats including, but not limited to, Excel, Word, Plain Text, HTML, XML and/or the like.

DETAILED DESCRIPTION OF THE PREFERRED EMBODIMENTS

Figure 1:
FIG. 1 is a depiction of an activation button that is present in a software toolbar of the plug-in (add-on) computer software code in accordance with the present invention

The present invention may be understood more readily by reference to the following detailed description of the preferred embodiments.

Definitions

For purposes of clarity, various terms and phrases used throughout this specification and the appended claims are defined in the manner set forth below. If a term or phrase used in this specification, or in the appended claims, is not defined below, or otherwise in this specification, the term or phrase should be given its ordinary meaning.

The phrases "architectural CAD software," "architectural Computer Aided Design software" and "architectural software design tool" as used herein refer to specialized computer software (computer readable instructions and/or data, typically in the form of a code) that enable engineers and/or architects to design structures, such as rooms, houses, commercial buildings, construction elements (doors, windows, walls, floors, ceilings and the like), furniture and the like, on a computer, for example, TurboCAD V8 software (version 9), AutoCAD® software (versions 2002, 2004 and 2005), AutoCAD Architectural Desktop™ 2002 and 2004 and Autodesk Map® 5, 6 and 3D. Often, in addition to this specialized software, architectural CAD systems use a graphics monitor, a light pen or digitizing tablet for drawing, and a special printer or plotter for printing design specifications. Architectural CAD software is commercially available from sources that are known by those of ordinary skill in the art, for example, from CAD companies directly, or from CAD software dealers, such as Design Integrations Inc. (Marietta, Ga.).

The phrase "breather tube" as used herein means a small metal tube that is placed into an insulated unit's spacer to equalize pressure differences. Breather tubes can allow moisture to enter into the insulating unit, and are mostly used in high altitude locations.

The phrases "building products" and "construction elements" as used herein include, but are not limited to, windows, doors, acrylic glass or other blocks, fireplaces, sky lights, cabinets, fireplaces, Forced Air Units, drywall, lumber, insulation, molding, laminates, plumbing fixtures, electrical fixtures and the like.

The abbreviation "D" as used herein means "dimensional." For example, 2D refers to two dimensional, and 3D refers to three dimensional.

The phrase "immediately" as used herein typically means right away (i.e., within a period of less than about a few minutes) but, in some cases, may mean within the same day.

The phrase "1stPricing" as used herein refers to 1ST Pricing, which is currently physically located at 1858 East 20th Street, Signal Hill, Calif., 90755, and is a subsidiary of California Distribution Center, Inc. (a California corporation). 1stPricing has an online 1stPricing dot com web site or other designated web sites.

The phrase "1stWindows" as used herein refers to 1stWindows, which is currently physically located at 1858 East 20th Street, Signal Hill, Calif., 90755, and is a subsidiary of California Distribution Center, Inc. (a California corporation). 1stWindows has an online 1$^{st}$Windows web site or other designated web sites.

The abbreviation "ISP" as used herein means Internet Service Provider.

The phrase "parametric symbol" as used herein means an architectural 2D or 3D drawing that is typically of a common architectural, mechanical, construction or electronic element, such as a window, an entry or interior door, an acrylic glass block, a sky light or the like, and that includes parameters about its characteristics, such as size, color, type of material (wood, vinyl, aluminum, etc.), presence or absence of grids, number of grids, type of glass, coating on the glass, presence or absence of breather tubes, and the like. Parametric symbols typically enable an architect, other designer and/or architectural CAD software to work with an object as a real-world entity, rather than just as lines and polygons.

The term "parameter" as used herein means the desired or necessary characteristic(s) for a particular construction element, such as size (height, width and/or depth), type of material (vinyl, wood, aluminum or the like), color, type of glass, coating on glass, header height, presence or absence of grids, number of grids, presence or absence of breather tubes, presence or absence of Argon gas, and/or the like. For example, a window may have parameters of being 3'×6' in size (as opposed to a different size), made out of steel (as opposed to wood, aluminum or some other material), being vinyl clad (rather than not being vinyl clad), including low E glass (as opposed to some other type of glass) and having the color white (as opposed to some other color).

The phrase "parametric symbol schedule" as used herein means a schedule that includes selected parametric symbols, and selected characteristics that correspond with the selected parametric symbols. It may or may not include price information for the selected parametric symbols.

The phrase "price schedule" as used herein means a "parametric symbol schedule" that includes pricing data that corresponds with selected parametric symbols, and selected characteristics that correspond with the various parametric symbols selected.

The phrase "Static Product Cart Technology" as used herein means a "standard" (traditional) "off the shelf" type of shopping cart technology that can be purchased commercially, and that does not have any intelligence. It is typically used by a wide variety of known and unknown product manufacturers, such as Circuit City and Best Buy, for selling standard products. "Static Cart Product" technology does not use zip codes, a software design tool or a plug-in (add-on) computer software code, and does not have parametric symbols inserted into a construction plan. Further, it cannot create a price schedule from price quotes.

The phrase "symbol palette" or "palette" as used herein means a dialog box that has all of the options that a user can choose for a particular object or construction element. (See FIGS. 10-13.)

General Description

The present invention is directed to an automated pricing system in which a price schedule for a construction product, such as a window, is generated and inserted directly into a set of construction project plans. For example, in a preferred embodiment, the construction product can be a construction material, such as a window, an acrylic glass block, a door, a skylight and/or the like, and is inset into the construction plans. Of course, it is to be understood that any number of product types can be employed, and any other different symbols can be employed in a different embodiment other than construction materials, without departing from the present invention. The description that follows, with particular applicability to construction materials, should be regarded as exemplary and not limiting.

The present invention is preferably implemented using a plug-in (or add-on) computer software code component that has an ability to work within an architectural CAD (Computer Aided Design) software product and with an online 1stPricing dot com, 1stWindows dot com or similar database. While most of the discussion that is set forth herein refers to the 1stPricing online web site or database, the 1stWindows dot com online web site or database, or a similar web site or database, may also be employed. Each construction element selected by a user, such as a window, an acrylic glass block, a door and/or a skylight, is inset into the building plans via one or more selected parametric symbols that are present in the plug-in (add-on) computer software code. Each parametric symbol adds a combined two-dimensional and/or three-dimensional representation of the associated (corresponding) construction product to the construction plans. Very advantageously, a cost value (final price) is calculated by an online 1stPricing dot com or similar database for each selected construction element (parametric symbol), which may optionally advantageously include a price comparison for each selected construction product between different available manufacturers within a selected zip code, in order that a user may procure "the" best or most competitive price for each selected construction product, and a total (final) cost is then advantageously automatically and virtually instantaneously calculated by the same database (typically within from about 5 to about 15 seconds) for an entire set of construction elements (all of the selected parametric symbols). Advantageously, a price schedule that includes the foregoing costs is then automatically and virtually instantaneously (typically within about 1 to about 13 seconds) created by the online 1stPricing database, and then the price schedule advantageously is inset directly into the building plans by the plug-in (add-on) computer software code, so that the building plans themselves advantageously include each selected parametric symbol, as well as a final price schedule for all such parametric symbols. The price schedule advantageously contains a detailed list of the selected construction products with attached corresponding pricing to provide a total cost value therefore. The price schedule can also be exported as a standalone object in the form of various common computer applications or formats including, but not limited to, Excel, Word, Plain Text, HTML, XML and the like. Pricing is determined via an Internet or other connection between the architectural plan drawer's local computer system and a database maintained on a remote system, such as the online 1stPricing database. Product data (product characteristics and features) passes from the architectural plan drawer's local computer to the database, and pricing data then passes back to the architectural plan drawer's local computer and becomes embedded within the construction plans. The system may be implemented over the Internet, a LAN, a physical storage medium, a CD, a DVD and/or the like.

The basic steps of a practical implementation of the present invention are laid out herewith. Detailed explanations and step-by-step processes are set forth in detail in associated sections hereinbelow.

Installation of Architectural CAD Software on Local Computer

An initial step of the methods and systems of the present invention is to install architectural CAD (Computer Aided Design) software (or another architectural software design tool) on an architect or plan drawer's local computer system. The plug-in (add-on) computer software code of the present invention, in the form of installation files, is also preferably installed on the same local computer system during the basic installation of the architectural CAD software. Alternatively, the plug-in (add-on) computer software code of the present invention may be installed after an installation of the architectural CAD software, and could be acquired either from a physical storage medium containing the add-on code (e.g., a compact disc), or by its download from a remote server system, such as from the 1stPricing web site or another designated web site. (See the section set forth hereinbelow regarding "Installation.")

After the software installation, the architectural CAD software program (or another architectural software design tool) is then started in a manner known by those of skill in the art. An existing architectural CAD drawing, for example, for a room in a house or in a commercial building, is then opened, or a new set of architectural or design plans is created using an architectural CAD "Wall" (or similar) tool in a manner known by those of skill in the art. (See the section set forth hereinbelow regarding "Interacting with the Wall Tool.") The Symbol Palette of the desired object (dragged and dropped from the symbol library—See FIG. 3) is then activated in a manner known by those of skill in the art. (See the section set forth hereinbelow regarding "Activation.")

In an embodiment of the invention in which a database containing pricing information is maintained on a remote server system, such as an Internet web site, for example, the online 1stPricing dot com web site, a connection is activated by the CAD user, who has the plug-in (add-on) computer software installed within his architectural (or other) CAD program, e.g. an Internet connection. For a first-time user (generally an architect or builder) accessing the remote server system database, a ZIP code may be entered to obtain pricing information for construction products in connection with the construction project, which may be obtained in connection with one, two, three, four, five or more different manufacturers and/or distributors within the zip code (to procure "the" best price for each construction product). The price of selected construction products (windows, doors, acrylic glass blocks, sky lights and/or the like) can, of course, vary widely with the geographical location of the construction project. Alternatively, such a price schedule can be generated without the use of a ZIP code. A parametric symbol (window, door, acrylic glass block, sky light and/or the like) is clicked, and a symbol palette dialog box opens up with the various options/attributes to select. Data for the product options are entered via drop down boxes, check boxes or radio buttons, or via direct data entry, and then clicking "OK." By clicking "OK," the user selects the options/attributes for the parametric symbol and inserts the resulting object into the construction plan. (A parametric symbol becomes an object once the user attaches attributes to it and inserts it into the construction plan.) Entry is then made of specific parameters that make up the parametric symbol, such as color, type of material, size, presence or absence of grids and the like. The parametric symbol is then inserted into the construction or design plans, for example, into a wall of a kitchen of a house. From there, the parameters of the parametric symbols can be modified, as is necessary or desired. (See the section set forth hereinbelow regarding "Symbol Properties.") The latter two steps can be repeated to establish the desired placement of the construction elements for the construction project into the construction plan drawings. Afterwards, a price schedule is created. (See the section set forth hereinbelow regarding "Scheduler Creation Controls.")

Each of the parametric symbols can be revised, added, deleted, modified and/or edited in any manner that is desired, or as the construction project requires. The price schedule can then be updated one or more times, and then transmitted (exported) over an Internet connection, a LAN (local area network), an external storage device or the like into a database. Revised pricing information can then be sent back to the architectural CAD drawing, which reflects new changes that have been made, and provides a price schedule "Reference Number." This price schedule "Reference Number" can be entered into a database to retrieve pricing information, upon which the building products (doors, windows, and/or the like) listed in the price schedule can advantageously then be immediately purchased, or purchased on a subsequent date. (See the section set forth hereinbelow regarding "Online Operations.") Each time an object is changed after the initial drawing has been priced, the plug-in (add-on) computer software reminds the plan drawer that plan pricing should be updated. Also, the plug-in (add-on) computer software pings the pricing data base periodically to see if any pricing has changed, or if there is a new version of the plug in (add-on) computer software, and then asks the plan drawer to make appropriate updates.

Installation of Plug-In Computer Software on Local Computer System—FIG. 1

Installation of the plug-in (add-on) computer software code component, which a user may obtain from a CD ROM or download from the 1stPricing or other website, on the same local computer system may be accomplished via a set of installation files in a manner known by those of skill in the art. These installation files may be part of the architectural CAD software installation program, or may be accessed from a CD, LAN, WAN, Intranet, Internet or any other such medium. The installation procedure typically requires the running of a Setup.exe (executable file), preferably using standard Windows™ OS methodology, although the invention can also be implemented using Mac, Linux or any other such type of operating system. It is contemplated to include an opening advertisement popup to the architectural CAD software, promoting the present invention. This popup could appear each time that the architectural CAD software is started. Selecting a checkbox that would be imbedded within the popup would deactivate it.

The plug-in (add-on) computer software code is a set of computer code that is designed to run within a parent computer software application or code, particularly architectural CAD software (or another architectural software design tool), as an internal component, i.e., it "adds on" to the parent software application. Installation of the plug-in (add-on) computer software code has an effect of placing "parametric symbols" files, and associated data files, onto a computer in which the plug-in (add-on) computer software is installed. The parametric symbols in the parametric symbols files depict popular configurations of common products, preferably construction elements, such as different types of windows, doors, acrylic glass blocks, sky lights, cabinets, fireplaces, Forced Air Units, drywall, lumber, insulation, molding, laminates, plumbing fixtures, electrical fixtures, and the like. In a preferred embodiment, three types of parametric symbols are provided: (1) Windows; (2) Doors; and (3) Acrylic Glass Blocks. The installation of the plug-in (add-on) computer software code also typically adds the following controls to the architectural CAD software: (1) an "activation" button, which is added to the main architectural CAD software toolbar, as is shown in FIG. 1; (2) a menu item labeled "1stPricing," which is added in the architectural CAD software "View" menu; and (3) a "1stPricing" parametric symbol palette, which is added to the architectural CAD software palettes.

Figure 2:
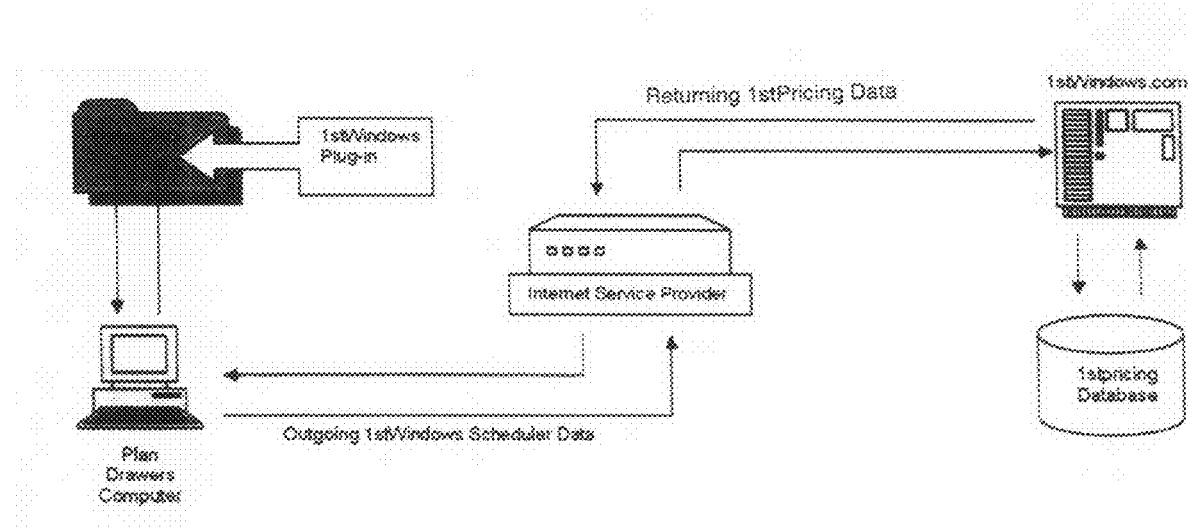
FIG. 2 is a flow chart that illustrates the basic data interaction between the plug-in (add-on) computer software code and a, 1stPricing dot com or 1stWindows online database in accordance with the present invention.

Data Flow—FIG. 2

FIG. 2 shows the basic data interaction that occurs between the plug-in (add-on) computer software code described hereinabove and the corresponding online or other database of pricing data and/or information. The plug-in (add-on) computer software code operates within the architectural CAD software, and sends outgoing data and/or information regarding all of the parametric symbols that have been selected by the user (construction products), and that have been imbedded within the construction plans, and their parameters, to a remote server system (FIG. 2). The outgoing data is preferably sent from the user's local computer over the Internet via the user's ISP to a web site on a remote server system, for example, the online 1stPricing web site (FIG. 2). The remote server system implements a pricing database in accordance with the present invention, and with the plug-in (add-on) computer software code. The plug-in (add-on) computer software makes the parametric symbols/objects "smart" by assigning code to the parametric symbols/objects once they are inserted into the construction plan. When pricing is generated, this plug-in (add-on) computer software counts the objects along with their assigned code, and then goes out of the program to the external database and provides a zip code. Then, this plug-in (add-on) computer software gives the list of objects and their attributes to the server, and asks for a match. After that, the plug-in (add-on) computer software sends the matches and the pricing back to the CAD user's computer. (The remote server is a database of pricing and "talks" to CAD drawing objects when they come in. The plug-in (add-on) computer software is a communication link from CAD to the database server and back to CAD.)

Computer software that is present on the remote server system, such as on the online 1stPricing dot com web site, compares the information and/or data that it receives from the user with a pricing database that is present at the remote server system to determine appropriate prices for the various construction or other products, and for the particular characteristics (parameters) thereof, that are represented by the parametric symbols. The computer software then returns the pricing information and/or data, preferably over the Internet, to the user's local computer system (FIG. 2). The plug-in (add-on) computer software code receives the pricing data provided from the remote server system, generates a price schedule for the construction or other elements, and imbeds the price schedule with the pricing directly into an architectural CAD drawing, such as into a window that is present in a kitchen of a house.

Figure 3:
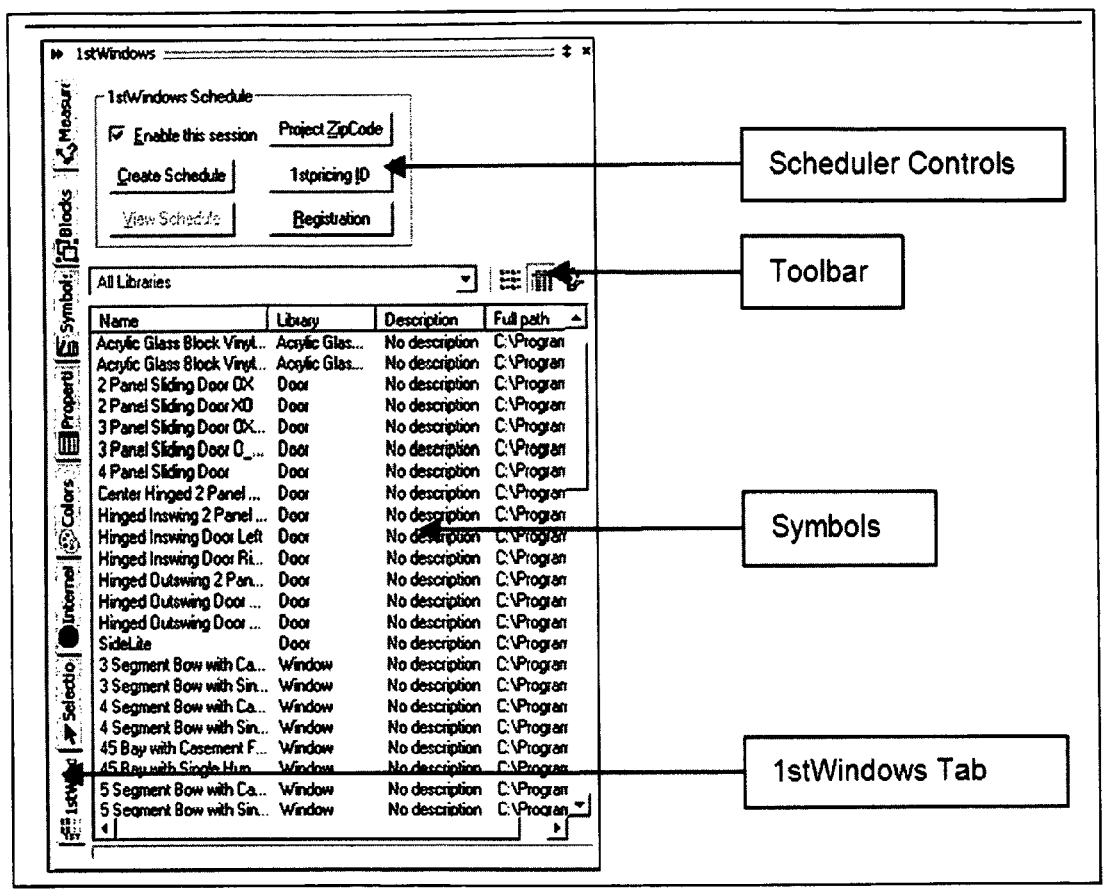
FIG. 3 illustrates a Parametric Symbol Palette that is present in the plug-in (add-on) computer software code that is used with the present invention.

Symbols Palette—FIG. 3.

As shown in FIG. 3, a Symbols Palette, which becomes present on the user's local computer as a result of the plug-in (add-on) computer software code, includes a set of controls and a list of one or more architectural parametric symbols. The controls are divided into two groups: (1) a toolbar; and (2) scheduler controls. In the disclosed embodiment, the parametric symbols are preferably organized into three groups or libraries: (1) windows; (2) doors; and (3) acrylic glass blocks.

Activation

The Symbols Palette cannot be used until it is activated. Clicking the activation button or menu item that is present therein will launch (activate) the Symbols Palette. After installation of the plug-in (add-on) computer software, the Symbols Palette can be launched by default. To activate the Symbols Palette, an architect or other user may: (1) click the "1stPricing activation" button; (2) select "View/1stPricing" from the menu; or (3) click the "1stPricing" tab in the architectural CAD software palette.

Figure 5:
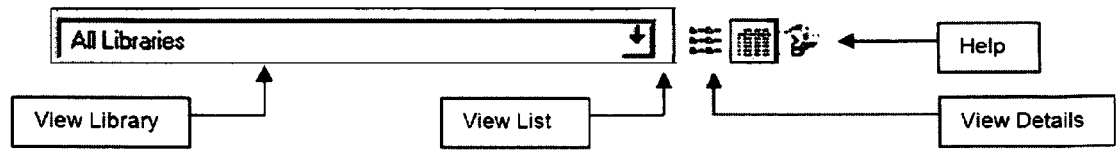
FIG. 5 shows the toolbar of the Parametric Symbol Palette that is illustrated in FIG. 3.

Toolbar—FIGS. 4 and 5

In a preferred embodiment of the invention, as is shown in FIG. 5, the toolbar comprises four controls, which include one drop down menu, and three buttons, and are as follows:

(1) A "View Library" drop down menu allows the user to arrange a list of available parametric symbols to display a specific type of parametric symbol, such as windows, doors, skylights, acrylic glass blocks, and/or the like, or to view all of the parametric symbols by selecting the "All 1$^{st}$Pricing Symbols" option.

(2) A "View List" button allows the user to set the parametric symbols list, so that only the names of the parametric symbols appear, such as Bay with Casement Flankers, or 2 Panel Sliding Door XO.

(3) A "View Details" button allows the user to set the parametric symbols list, so that each parametric symbol is listed with four details (FIG. 4): (1) Name; (2) Library; (3) Description; and (4) Full Path. The parametric symbols are listed vertically, with the detail organized in four columns horizontally. When this option is selected, an additional control button is appended to the top of each of the detail columns. Clicking on any of these additional buttons reorders the symbols list alphabetically by the detail that the associated column contains.

(4) A "View Help" button allows the user to open a "1stPricing" help system, which permits the user to get help.

Parametric Symbols—FIGS. 6, 7, 8 and 9

A set of one or more architectural parametric symbols are preferably provided by the plug-in (add-on) computer software code to represent a majority (or more) of possible options that are generally available to a user of the system of the present invention. Each parametric symbol typically has unique aspects and attributes (parametric symbol values) which, optionally, may be selected by a user prior to inserting a parametric symbol into a construction plan drawing, such as width, height, color, depth, thickness of glass and/or texture, and is a combination of two architectural CAD objects: (1) a two-dimensional representation of a construction element; and (2) a three dimensional representation of a construction element (as is shown, respectively, in FIGS. 8 and 9). However, the user does not need to select any parametric symbol values for any parametric symbols, which values are optional, because each parametric symbol will typically have pre-set parametric symbol values, which will be used unless the user selects different parametric symbol values, as is discussed below. The parametric symbols are designed to interact with an architectural CAD software "Wall Tool" (or similar tool). After a user optionally selects one or more parametric values for one or more parametric symbols, the parametric symbols are inserted into the construction plan drawings by clicking on one or more of the parametric symbols that are present in the list of parametric symbols that is present in the Symbols Palette, and then moving (dragging) them into the architectural drawing, such as a room of a house. A parametric symbol advantageously will automatically aligns itself with the orientation of a wall of a structure, such as a house, if applicable, or with any other applicable location, thereby showing the user a preview of the parametric symbol prior to placing the parametric symbol within the architectural drawing.

Before a parametric symbol is moved into the construction plans, preferably a "1stPricing Symbol Properties" palette (or similar) dialog automatically appears. This "1stPricing Symbol Properties" palette dialog allows "parametric symbol values," such as color, construction material, size, presence or absence of grids, layout of grids, number of grids, type of glass, and the like, for example, in the case of a window, 42"×36", Standard Pattern Flat Grids and 5 Segment Bow, or in the case lumber, 2"×4"×10' lumber, to be optionally specified for each parametric symbol that is present in the Symbols Palette. Entry is made of specific parameters that make up the parametric symbol (parametric symbol values) by clicking on various available drop down menus, and then selecting specific available parameters, as is described herein.

Figure 6:
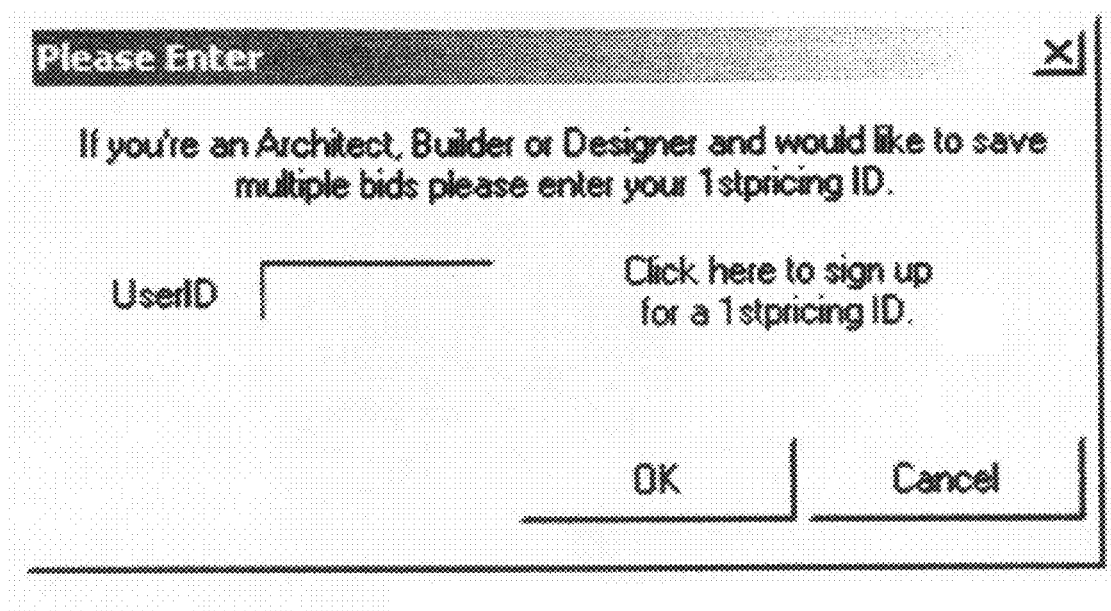
FIG. 6 shows a User ID dialog that appears in the plug-in (add-on) computer software code when a first parametric symbol is inserted into a set of construction plans (by clicking on the parametric symbol in the Parametric Symbol Palette).

Parametric symbol values can include any size or material specification for a given item, such as a construction product (window, door, acrylic glass block sky light, and the like), including a standard product item number for a respective construction element. In a new drawing, as is shown in FIG. 6, a User ID dialog preferably automatically appears when the first parametric symbol is inserted into the construction plans if a User ID has not yet been entered by the user. Further, and very advantageously, the "1stPricing Symbol Properties" palette dialog may be recalled to edit one or more parametric values for any parametric symbol that has already been inserted into the construction plans. Selecting a parametric symbol and clicking the right button on a computer mouse will generally open a local menu. Selecting the "1stPricing Symbol Properties" palette option from the local menu will generally open the "1stPricing Symbol Properties" dialog for the parametric symbol.

Figure 7:
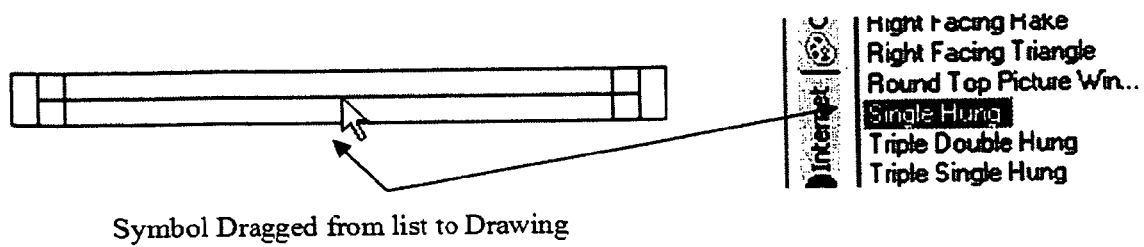
FIG. 7 illustrates an operation for inserting parametric symbols into a set of construction plans in accordance with the plug-in (add-on) computer software code of the present invention.
Figure 8:
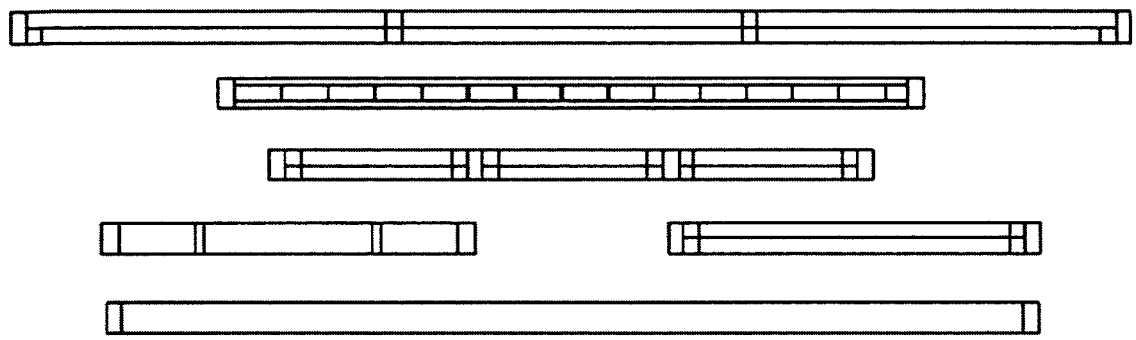
FIGS. 8 and 9, respectively, show two and three dimensional representations of the parametric symbols that may be employed in accordance with the plug-in (add-on) computer software code of the present invention.
Figure 9:
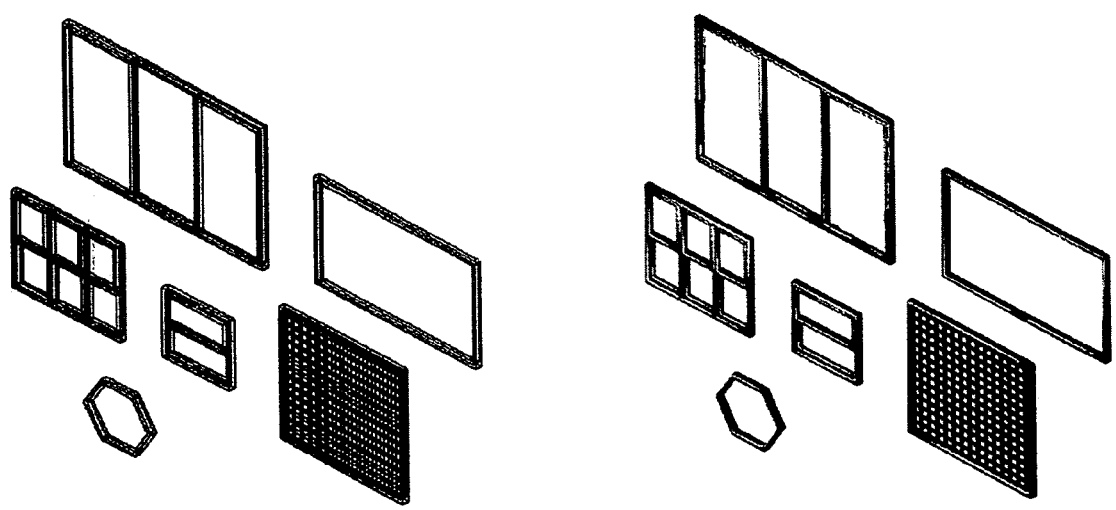

Operation can be employed, for example, in the manner that is shown in FIG. 7. A user may click on the parametric symbol to be inserted into the construction plans, and move (drag) the parametric symbol to a particular location in the construction plans where it is to be inserted, such as a particular wall in a kitchen of a house, and then release the button. The user may modify the parametric properties using the "1stPricing Symbol Properties" palette dialog, as is desired or necessary. When the parametric symbol is placed into the construction plans, and modified as desired or required, the user may click "OK," which causes the object to change to reflect the new parameters entered into to the palette.

Symbol Properties

Each type of parametric symbol corresponding to a product item, such as a construction element (windows, doors, acrylic glass blocks, sky lights and the like) has a unique set of parametric attributes (properties) that may be specified for each parametric symbol. In addition, each specific parametric symbol has a unique range of values that is permissible for those parametric attributes. Typically, parametric symbol properties may only be edited by using the "Properties Dialog." To edit the parametric symbol properties, a user should select the parametric symbol to be modified, and then click the right mouse button. The user should then select "1stPricing Properties" from the local menu and modify the parametric symbol properties in the Properties Dialog as is necessary or desired. When the parametric symbol properties are modified as required or desired, the user should then click "OK."

Figure 10:
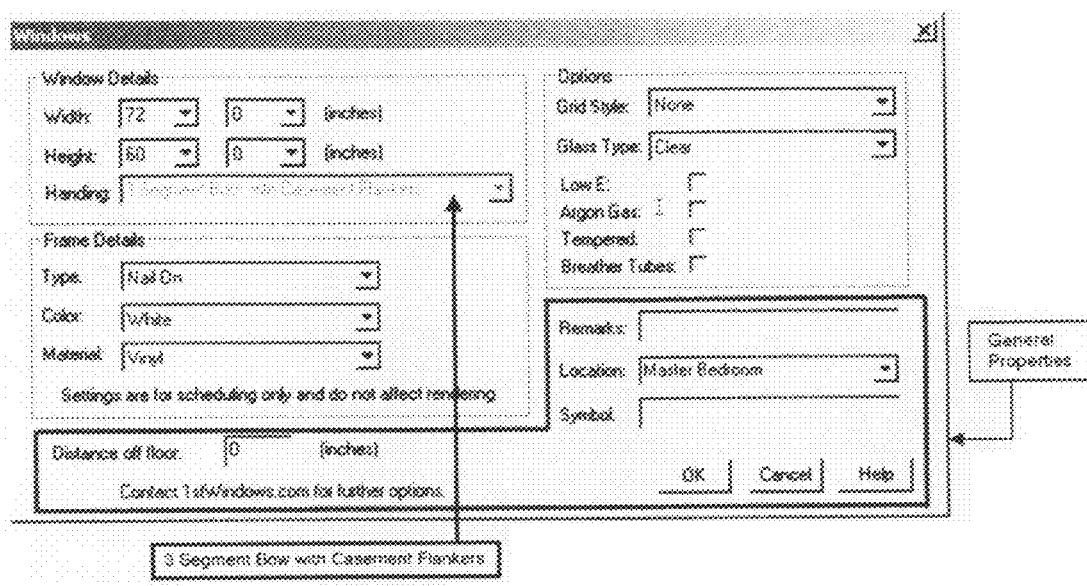
FIG. 10 shows a portion of a dialog for specifying general properties for one or more parametric symbols (location, remarks, distance off of floor, and the like) in accordance with the plug-in (add-on) computer software code of the present invention.

General Properties for Parametric Symbols—FIG. 10

As is shown in FIG. 10, "General Properties" are available for all parametric symbol types. The "Parametric Controls" that are available as General Properties are indicated as follows. The "Symbol" text box field allows the user to notate individual parametric symbols (to put a text notation next to the parametric symbol/object when it is inserted into the construction plan). The notation will typically also be placed on the price schedule. The "Location" text box field allows the user to notate (to insert a personal remark or notation) the physical location of the parametric symbol in the set of construction plans (e.g. master bedroom, kitchen, living room, bathroom, etc.). The "Remarks" text box field allows the user to make special notations about the parametric symbol, such as Game room or Master Bedroom. The "Distance off Floor" text box field allows the user to specify a measurement value that specifies where the bottom of the parametric symbol is set in relation to a floor, for example, how far a bay window is off of the floor. Advantageously, the plug-in (add-on) computer software code also includes an implementation wherein, upon insertion of a parametric symbol, the implementation indicates whether or not the location of that parametric symbol meets the criteria of a Uniform Building Code (UBC). The plug-in (add-on) computer software code knows the building codes for the various parametric symbols once they are inserted into the construction plan. It knows a window is a window, and that building codes are associated with it. For example, a window 2 feet from a door must be tempered. If a window is inserted less than 2 feet from a door, the computer program would let the user know to temper it. As another example, a 2"×4"16" on center wall framing can only be used for the first two floors of a structure. Thus, when a $3^{rd}$ floor of a structure is drawn on top of a 2nd floor, and the $1^{st}$ floor is 2"×4"16" on center, the computer program would let the user know that the $1^{st}$ floor must change to 2"×6"16" on center.

The Properties Dialog also contains three buttons that are present for all parametric symbols, which are: as follows:
- Clicking the "OK" button accepts the parametric symbol configuration, closes the Properties Dialog, and makes the appropriate changes in the construction plans;
- Clicking "cancel" closes the Properties Dialog, and ignores any changes that were made to parametric symbol properties; and
- The "help" button allows the user to open the "1stPricing" help system, which offers assistance in using the plug-in (add-on) computer software code, such as how to insert a parametric symbol into a construction plan.

Figure 11:
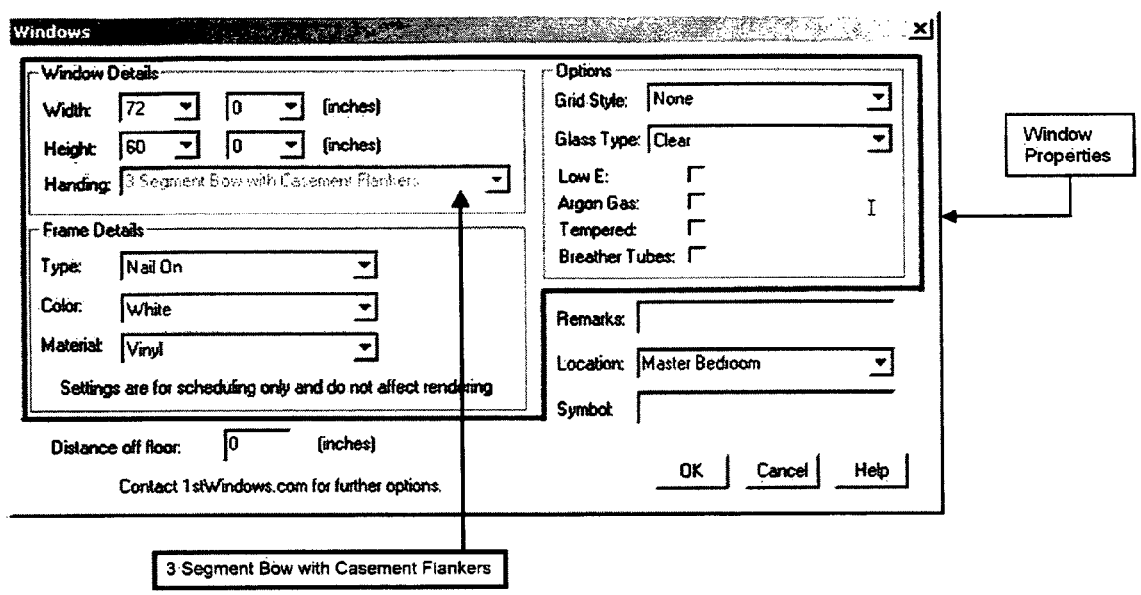
FIGS. 11, 12 and 13 show portions of respective dialogs in accordance with the plug-in (add-on) computer software code of the present invention for windows, acrylic glass blocks and doors, respectively, that specify attributes of particular parametric symbol types, such as the width, height, handling, frame type, color and composition of a window.

Windows Properties (for Windows Only)—FIG. 11

As is shown in FIG. 11, "Windows Properties" are specific parametric attributes that pertain specifically to windows. Specific ranges/options for windows may vary for each parametric symbol. As is discussed below, there are three Windows Properties' classifications for windows: (1) Window Details; (2) Frame Details; and (3) Options.

Window Details

The "Width" drop down menus that are located in the Symbols Palette are used to select width of windows in inches and in fractional inch increments. The "Height" drop down menus are used to select the height of windows in inches and in fractional inch increments. The "Handing" drop down menus are used to select the handing (right or left) type for the windows where applicable, such as for a 3 Segment Bow Window with Casement Flankers.

Window Frame Details

The "Type" drop down menu that is located in the Symbols Palette is used to select the window frame type, such as "Nail On" or block frame. The "Color" drop down menu is used to select the window frame color, such as white, black, green or the like. The "Material" drop down menu is used to select the composition of the window frame, such as vinyl, wood, aluminum, fiberglass or wood clad.

Window Options

The "Grid Style" drop down menu that is located in the Symbols Palette is used to select the desired window grid pattern, such as standard pattern flat, standard pattern sculptured, pattern 3a flat or pattern 2 sculptured. The plug-in (add-on) computer software code automatically calculates the grid frequency for a window based upon the size of the window. The "Glass Type" drop down menu is used to select the desired window glass type, such as Azurite, Solar Grey, Glue Chip, Obscured and the like. The "Low E" check box is used to select a Low Emissive Coating on the window glass. The "Argon Gas" check box is used to select Argon Gas filled window glass. The "Tempered" check box is used to select Tempered Glass for the window. The "Breather Tubes" check box is used to select breather tubes for the window.

Figure 12:
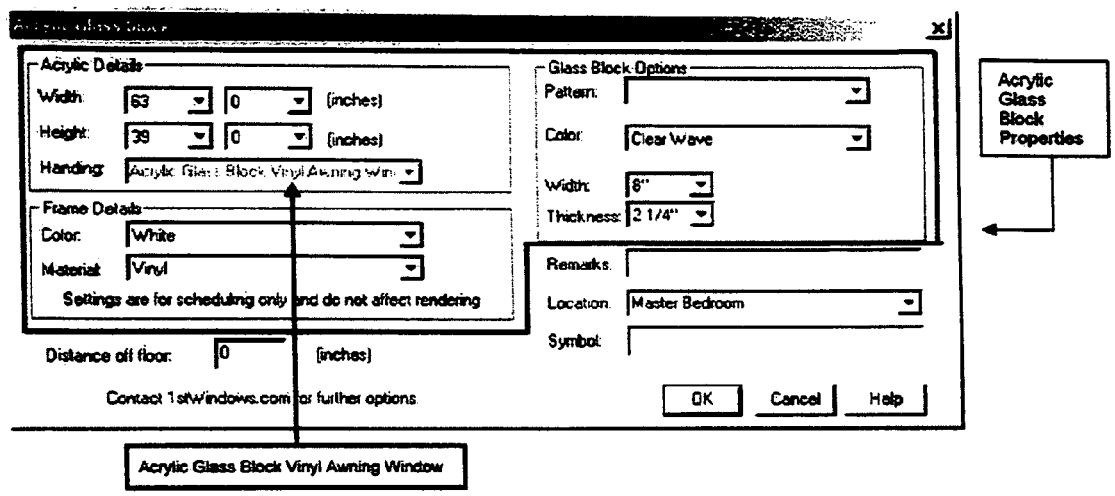

Acrylic Glass Block Properties (for Acrylic Glass Blocks Only)—FIG. 12

As is shown in FIG. 12, Acrylic Glass Block properties are specific parametric attributes that pertain specifically to acrylic glass blocks. Specific ranges/options for acrylic glass blocks may vary for each parametric symbol. There are three classifications for the acrylic glass blocks: (1) Acrylic Glass Block details; (2) Frame Details; and (3) Options.

Acrylic Glass Block Details

The "Width" drop down menu that is located in the Symbols Palette is used to select width of the acrylic glass block in inches and in fractional inch increments. The "Height" drop down menu is used to select the height of the acrylic glass block in inches and fractional inch increments. The "Handing" drop down menu is used to select the handing (right or left) type of the acrylic glass block where applicable.

Frame Details

The "Color" drop down menu that is located in the Symbols Palette is used to select the acrylic glass block frame color, such as white, black, green, blue or the like. The "Material" drop down menu is use to select the composition of the acrylic glass block frame, such as vinyl, wood, aluminum, fiberglass, wood or clad.

Acrylic Glass Block Options

The "Pattern" drop down menu that is located in the Symbols Palette is used to select the acrylic block pattern, such as diagonal patterns. The "Color" drop down menu is used to select the acrylic glass block color, such as clear wave, frosted wave, green or blue. The "Width" drop down menu is used to select the acrylic glass block width, such as 6". The "Thickness" drop down menu is used to select the acrylic glass block thickness, such as 2¼".

Figure 13:
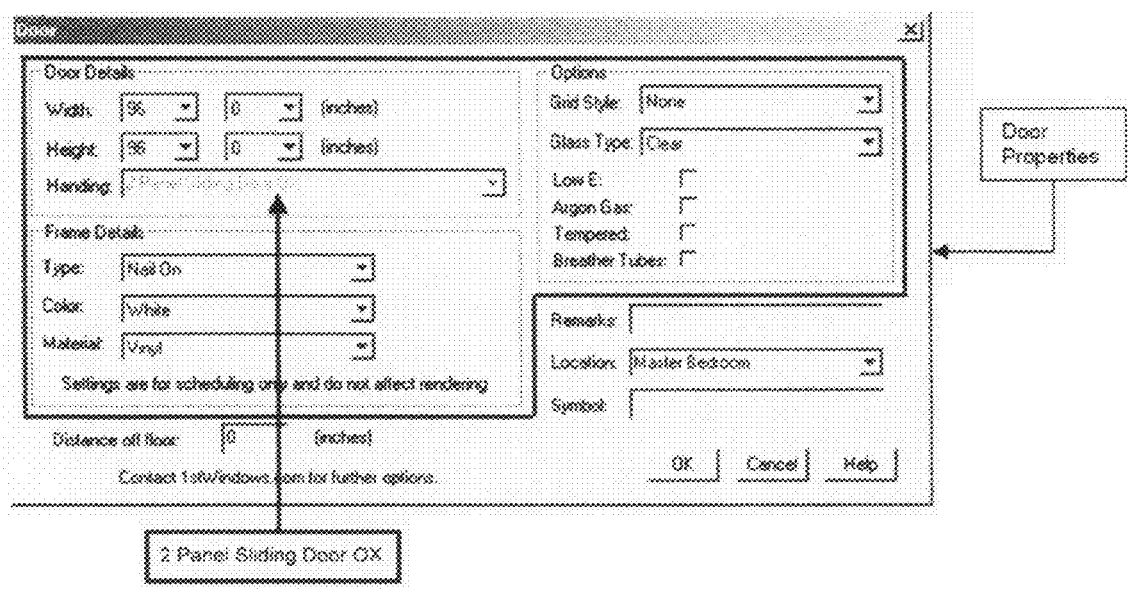

Door Properties (for Doors Only)—FIG. 13

As is shown in FIG. 13, "Door Properties" are specific parametric attributes that pertain specifically to doors. Specific ranges/options for doors may vary for each parametric symbol. There are three classifications for doors: (1) Door Details; (2) Frame Details; and (3) Options.

Door Details

The "Width" drop down menu that is located in the Symbols Palette is used to select width of a door in inches and in fractional inch increments, such as 96". The "Height" drop down menu is used to select the height of a door in inches and in fractional inch increments, such as 96". The "Handing" drop down menu is used to select the handing (right or left) of a door type where applicable, such as for a 2 Panel Siding Door OX. ("OX" means "O" is the stationary panel and "X" is the moving panel as viewed from outside of the door looking in.)

Frame Details

The "Type" drop down menu that is located in the Symbols Palette is used to select the door frame type, such as "Nail On" or block frame. The "Color" drop down menu is used to select the door frame color, such as white, black, blue, red, green or the like. The "Material" drop down menu is used to select the composition of door frame, such as vinyl, wood, aluminum or fiberglass.

Options

The "Grid Style" drop down menu that is located in the Symbols Palette is used to select the desired grid pattern of the door, such as standard pattern flat, standard pattern sculptured, pattern 3a flat or pattern 2 sculptured The plug-in (add-on) computer software code automatically calculates the grid frequency based upon the size of the door. The "Glass Type" drop down menu is used to select the desired door glass type, such as clear, Azurite, Solar Grey, Glue Chip or Obscured. The "Low E" drop down menu is used to select a Low Emissive Coating on the door glass. The "Argon Gas" check box is used to select Argon Gas filled door glass. The "Tempered" check box is used to select Tempered Glass for the door. The "Breather Tubes" check box is used to select breather tubes for the door.

Pricing Scheduler Controls—FIG. 14

As is shown in FIG. 14, the "Scheduler Controls" provided by the plug-in (add-on) computer software code are used to create and maintain a price schedule that is generated using the parametric symbol data that is contained in the construction plans. A price schedule is a detailed part list of the parametric symbols that are contained in the construction plans with appended pricing data. The pricing scheduler of the present invention typically uses an Internet connection to access corresponding pricing data from a remote server system, such as a web site, for example, the online 1stPricing web site. If no Internet connection is present, an open price schedule may be generated, but pricing data will typically be absent. Only one piece of data is generally required for the pricing portion of the scheduler to work, which is a ZIP code for the location of the construction project. One control which is accessible from different paths in the pricing scheduler is used to input this pricing data. (If the user does not allow one or more parametric symbols to be priced, no list of materials, or corresponding pricing, will be provided. However, the user can still draw the objects.)

Pricing Scheduler Data Controls

As is described below, and as is shown in FIG. 14, three Pricing Scheduler Data Control buttons are used to create and/or update the price scheduler for accurate operation: (1) Registration Button; (2) Project ZIP Code Button; and (3) 1stPricing ID Button.

Registration Button—FIG. 15

Figure 17:
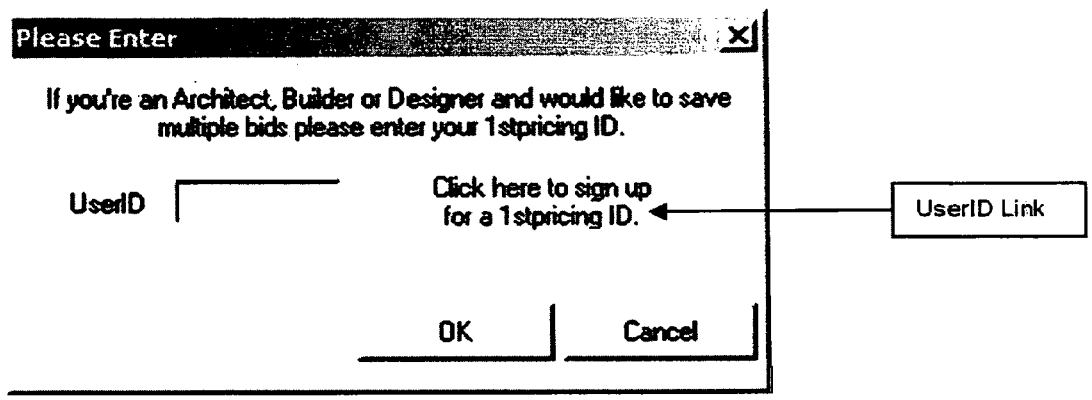
FIG. 17 depicts the "User ID" dialog opened upon actuation of the "Zip Code" scheduler control button in accordance with the plug-in (add-on) computer software code of the present invention.

For new users, clicking the "Registration" button opens up the Registration Dialog that is shown in FIG. 15. To first get to the "Registration" button, the user can also click on the 1stPricing ID button (FIG. 17). The user should then click a "Click here to sign up for a 1stPricing ID" link, which opens up the "Registration" dialog box (FIG. 15), and complete the registration form that appears once the Registration Dialog is opened, which registers the new user with the online 1stPricing web site maintained by 1stPricing. An active Internet connection is typically required for this to work properly. The Registration Dialog typically provides the following controls for entering data: (1) a "First Name" text box (preferably mandatory); (2) a "Last Name" text box (preferably mandatory); (3) a "Company Name" text box; (4) an "Address" text box; (5) a "City" text box; (6) a "State" drop down menu; (7) a "Postal Code" text box; (8) a "Phone" text box; (9) a "Fax" text box; (10) an "Email" text box (preferably mandatory); and (11) an "Email me about updates and special offers" check box. To Register the new user with 1stPricing, the user clicks the "Registration" button, fills out the registration form (FIG. 15) and then clicks "OK." A new user confirmation notification is subsequently sent to the new user electronically (via the Internet, a LAN, etc.) or physically (U.S. mail, facsimile, etc.) containing the user information. Such registration creates an online account at the 1stPricing dot com web site maintained by 1stPricing, which can be used for placing orders for construction products, reviewing orders and comparison-shopping among a wide variety of different, and possibly competing, manufacturers and/or distributors that market products within the zip code selected. This, very advantageously, allows a consumer to procure the most competitive pricing within a particular zip code for one or more construction products having a wide variety of desired characteristics, for example, a white, vinyl clad, double pane bay window having a specific height, width and depth, a specific number and type of grids, a Low Emissive Coating on the glass, and tempered and Argon gas filled glass, as well as breather tubes.

Figure 16:
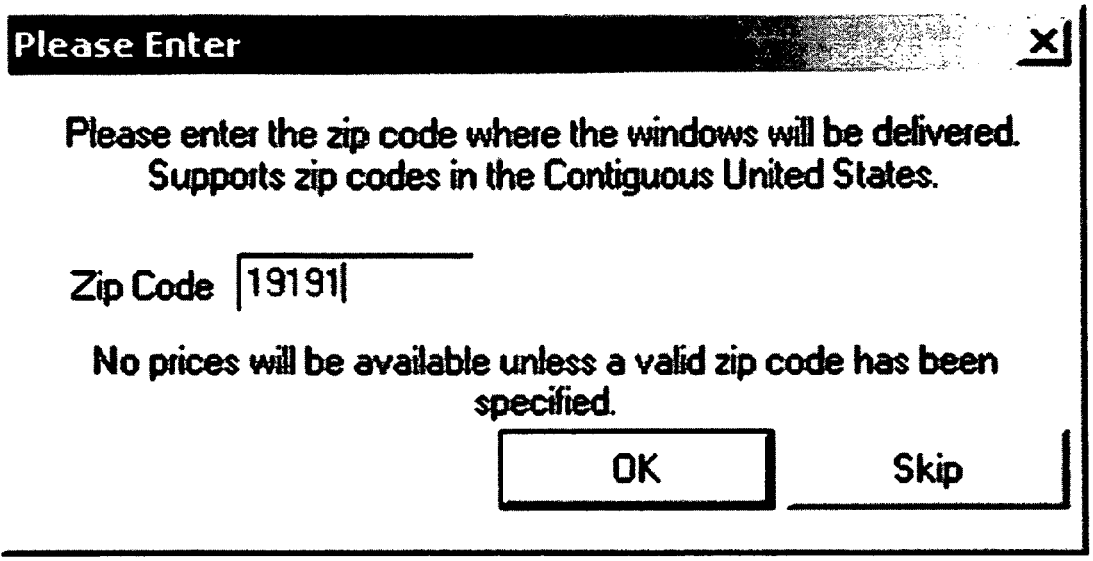
FIG. 16 depicts the "Zip Code" dialog opened upon actuation of the "Zip Code" scheduler control button in accordance with the plug-in (add-on) computer software code of the present invention.

Project ZIP Code Button—FIG. 16

Clicking the "Project ZIP Code" button opens a ZIP Code dialog, as is shown in FIG. 16. The ZIP Code dialog is used to enter the physical zip code of the site of a construction project, which is used to obtain an accurate price quotation for one or more construction products within that zip code that correspond to one or more parametric symbols that have been inserted into the set of construction plans. The ZIP Code dialog provides two buttons: (1) "OK"; and (2) "Skip." Selecting the "OK" button has the effect of entering the ZIP code into the pricing scheduler. Pressing "Skip" will cause ZIP code changes to be ignored, and the user will be prompted that a correct ZIP code is required for accurate pricing. To properly set the project ZIP code, the user should: (1) click the "Project ZIP Code" button; (2) then, enter the correct ZIP code for the project location; and (3) then, click "OK."

1stPricing ID Button—FIG. 17

Clicking the 1stPricing ID Button opens a "User ID" dialog, as is shown in FIG. 17. This User ID dialog provides a "User ID" text box field, which enables a user to obtain a "1stPricingID." In order to have a 1stPricing ID generated, and set a User ID, the user must typically first have filled out and submitted the Registration Dialog form (FIG. 15), as is described hereinabove. The User ID will typically initially be whatever the user specifies as a User Name on the Registration Dialog form. Clicking the "OK" button (FIG. 17) sets the User ID, closes the dialog, and provides the 1stPricing ID, which is also the set User ID. (The User ID and the 1stPricing ID are the same. The 1stPricing ID is a user ID name that the user has selected himself. He uses it along with a password to save pricing quotes.) The user is then typically sent a user name and Password ID electronically via Internet, e-mail, LAN, facsimile, U.S. mail, or the like. In contrast, clicking the "Cancel" button closes the dialog. To set the User ID as indicated above (and receive a 1stPricing ID), the user clicks the "1stPricing ID" button, and after properly registering, enters a User ID and then clicks "OK."

Parametric Symbol "Scheduler Creation" Controls

FIG. 19

The parametric symbol "Scheduler Creation" controls that are shown in FIG. 19 enable the creation, updating, and viewing of a schedule of selected parametric symbols, and their characteristics, which typically includes pricing data. The "Enable this Session" check box allows the plug-in (add-on) computer software code to connect to an online 1stPricing web site (or other designated web site) database containing pricing information from at least one to up to about ten or more different manufacturers (for all parametric symbols, and all parameters) to obtain pricing information for selected parametric symbols, and selected parameters (those that have been inserted into the set of construction plans). If this box is not checked, the parametric symbol scheduler and user will typically not be able to access a database containing pricing information, and the parametric symbol schedule will be generated without corresponding pricing data. The "Update" and "View Schedule" buttons are used once a plan has already been priced. "Update" will generate a new price schedule, and "View Schedule" takes the user to the existing price schedule.

"Create" and "Update" Parametric Symbol Schedule Buttons

FIG. 20

Figure 20:
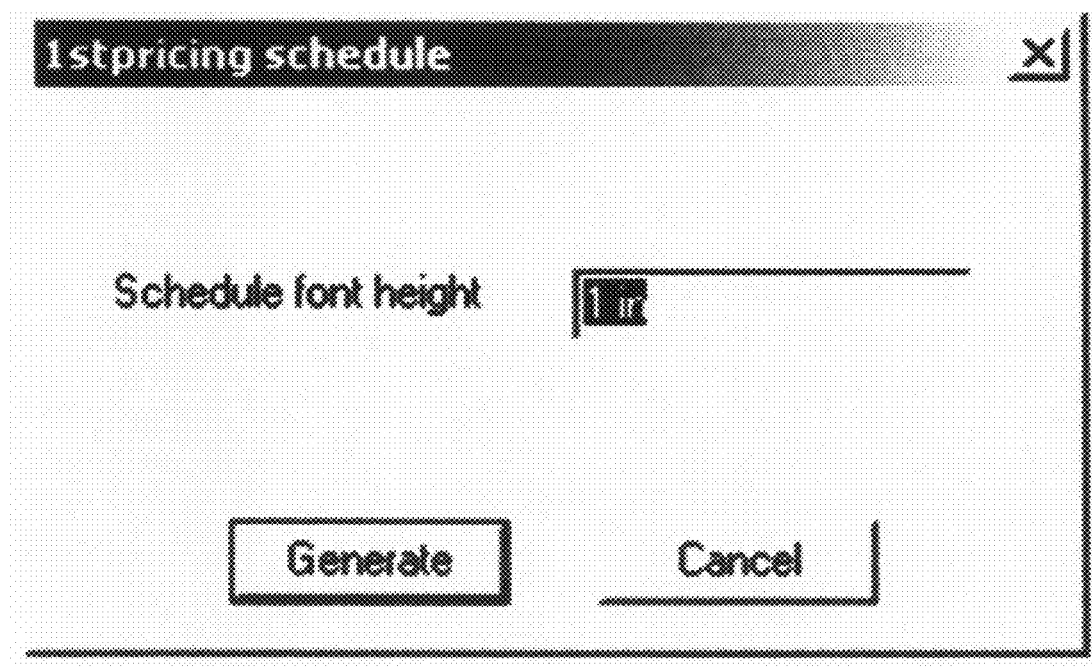
FIG. 20 shows a parametric symbol schedule dialog in accordance with the plug-in (add-on) computer software code of the present invention, which is used to generate a parametric symbol schedule based upon the parametric symbols that have been inserted into a set of construction plans in accordance with the present invention.

If no parametric symbol schedule yet exists, the user will see a "Create" button, which is located in the Symbols Palette (FIG. 3). Clicking on this Create button will open a "1stPricing" schedule dialog, as is shown in FIG. 20, which includes a "Generate" and a "Cancel" button. This "1stPricing" schedule dialog is used to generate a parametric symbol schedule that is based upon the parametric symbols, and their corresponding characteristics, that have been inserted into the construction plans. This "1stPricing" dialog also prompts the user to input the size of font to be used in the parametric symbol schedule for ease of reading the schedule. The size of the parametric symbol schedule that is generated depends upon the font size used, as well as upon the scale settings that are set by the plan drawer in architectural CAD. Thus, to create a parametric symbol schedule, the "Create" button is clicked, a schedule font height is typed in, and the "Generate" button is clicked. A parametric symbol schedule will then be created. The parametric symbol (or price) schedule can then be inserted directly into the construction plans by the plug-in (add-on) computer software code.

If, on the other hand, a parametric symbol schedule already exists, the user will see a different button on the Symbols Palette (FIG. 3) that is labeled "Update," instead of "Create," as well as a button labeled "Export Schedule." Using the "Update" button will have the effect of changing the parametric symbol schedule according to parametric symbol changes that have been made by the user since the creation of the parametric symbol schedule, for example, to change the selected size of a window, or since its last update. In all other respects, this procedure is the same as using the Create button. If the user clicks the "Export Schedule" button" (FIG. 3), the user is then asked the file format of the database that the user intends to use (Excel, Plain Text, Word, etc.), and where to save the parametric symbol schedule file on the user's computer.

When a parametric symbol schedule is generated, all of the schedule information is typically saved at the online 1stPricing or other designated web site, and can be accessed by the user using the plans' $1^{st}$ Pricing Reference Number generated by the plug-in (add-on) computer software code. When a user session is enabled, and there is an open Internet or other connection, a "Reference Number" is appended to the parametric symbol schedule. This number can be used to retrieve the parametric symbol schedule at the online 1stPricing dot com or other designated web site.

Some construction products may not be available in an area designated by the ZIP code that is entered by a user. In such an instance, pricing is not always listed for all of the parametric symbols that are inserted into the construction plans, and a "N/A" (not applicable) designation is typically placed into the parametric symbol or price schedule in place of a price.

"View Schedule" Button

Clicking a "View Schedule" button on the Symbols Palette (FIG. 3) will zoom to the part of the architectural CAD drawing of the construction plans where the parametric symbol (or pricing) schedule has been inserted. If one or more parametric symbols have been altered without updating the parametric symbol (or pricing) schedule, a message will be appended to the schedule that reads the same as, or similar to, the following: "Schedule may not reflect the window specifications." (If windows are not involved, the message will refer to the particular type of parametric symbols or objects that are involved, such as doors, acrylic glass blocks, cabinets, drywall or the like.)

The Schedule

FIG. 21

In the resulting price schedule that is shown in FIG. 21, unique parametric symbols, such as windows, doors, skylights, cabinets, acrylic block or the like, are listed vertically. Details (characteristics) for each parametric symbol are organized horizontally under the following columns: Symbol, Location, Width, Height, Handing, Color, Type, Material, Grid Style, Low E, Argon Gas, Tempered, Breather Tubes, Glass, Glazing, Remarks, Quantity and Pricing from at least one Manufacturer or Distributor.

Figure 22:
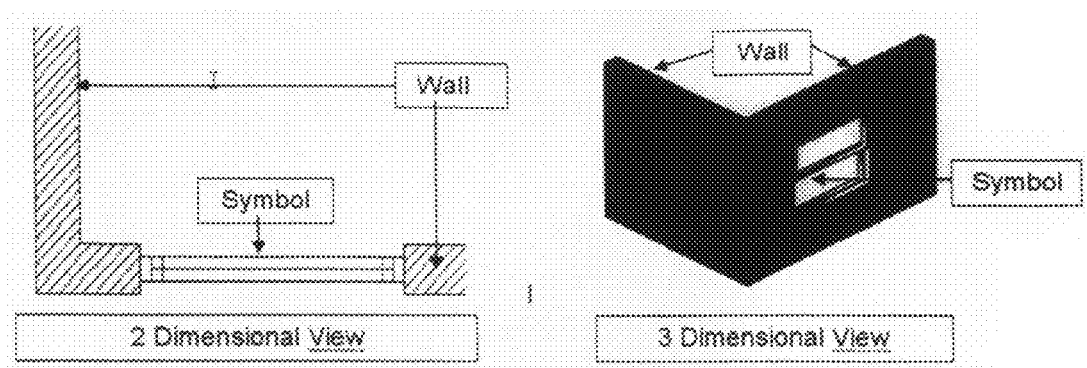
FIG. 22 shows in an architectural CAD "Wall Tools" feature, parametric symbols that are embedded into walls of a structure in accordance with the present invention.

Interaction of Parametric Symbols with CAD Wall Tool—FIG. 22

Very advantageously, as a result of the plug-in (add-on) computer software code, the architectural parametric symbols can be made by the user to auto-imbed into one or more wall depictions that have been created with the architectural CAD computer program, particularly its "Wall Tool," as is shown in the two-dimensional and three-dimensional depictions that are present in FIG. 22. A parametric symbol can be moved from the Symbols Pallet into a selected wall, for example, into a wall in a master bedroom of a house, or into a wall in an office of a commercial building. To insert a parametric symbol into a particular wall, the particular parametric symbol is dragged and dropped to the desired wall location, and then entry is made of the specific parameters that make up the parametric symbol into the construction plans at the site of the desired wall. The properties of the parametric symbols can be modified using the Properties Dialog, as is necessary or desired, and as is described hereinabove. Afterwards, the user clicks "OK." The parametric symbol will automatically, properly and almost instantaneously align with the wall and auto-embed itself into the wall, thereby permitting the user to see how the parametric symbol will look in the wall, or in a room that contains the wall. Appropriate cutouts for the parametric symbol are made in the wall, and the wall will then "heal" around the parametric symbol.

Online Operations

Procuring a Price Quote

FIGS. 23, 24, 25 and 26

Figure 23:
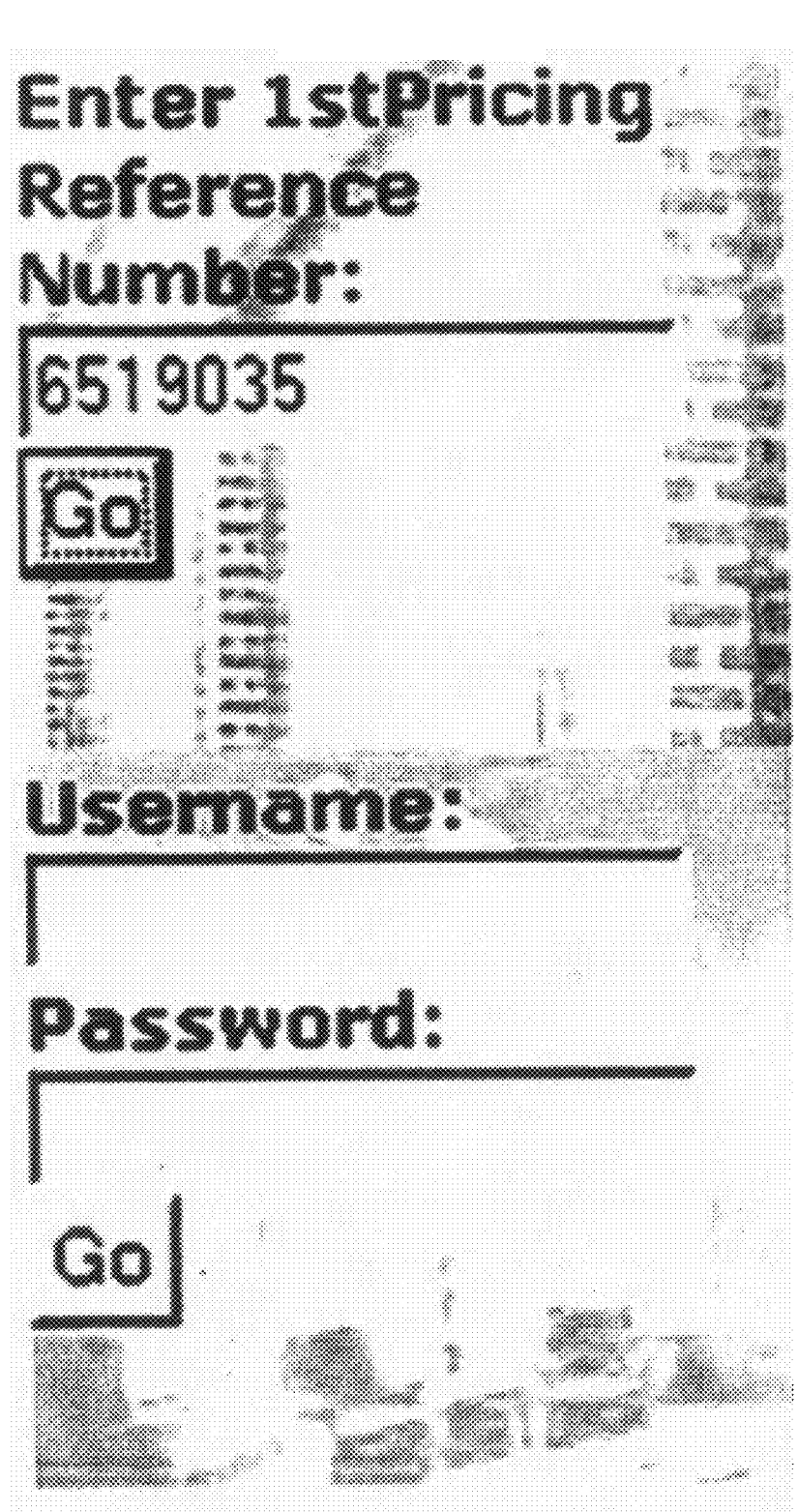
FIG. 23 shows a login screen in accordance with the plug-in (add-on) computer software code of the present invention in which a Reference Number may be inserted, which insertion has the effect of automatically logging a user onto the 1stPricing or 1stWindows dot com online database, which provides pricing information for selected parametric symbols (construction elements).
Figure 25:
FIG. 25 shows an exemplary price quote that is generated by the 1stPricing dot com or 1stWindows online database in accordance with the present invention.

As is shown in FIG. 23, the "Reference Number" listed on a 1stPricing Scheduler, such as 6519035, is the name of a price schedule. A Reference Number may be used on the online 1stPricing dot com or other designated web site to access pricing data that correspond to a particular parametric symbol schedule. Using the Reference Number will automatically log a user onto this web site. Price schedules may also be reviewed by logging onto the online 1stPricing or other designated web site by entering the $1^{st}$Pricing Reference Number and then clicking "Go." Once a pricing schedule has been displayed, the user may select the type of window, acrylic block, door and/or other type of manufacturer that it would like to receive a price quote from, as is shown in FIG. 24. A price schedule will typically be presented to the user when the user selects type and "Continue," as is shown in the example that is illustrated in FIG. 25. The user may also access Pricing Schedules by entering the User ID and Password that was created for the user during registration, as is described hereinabove. This will provide access to the "My Account" area of this web site. The user's account will contain all of the parametric symbol and price schedules that have been generated by the registered user. By selecting "View" of the desired price schedule, the user can access the pricing data.

If a price schedule needs to be changed, the user can click the "Alter Quote" button, as is shown in FIG. 26, and change the size and/or options for any or all of the products specified in the price schedule.

Comparison Shopping Among Different Manufacturers/Distributors

Figure 27:
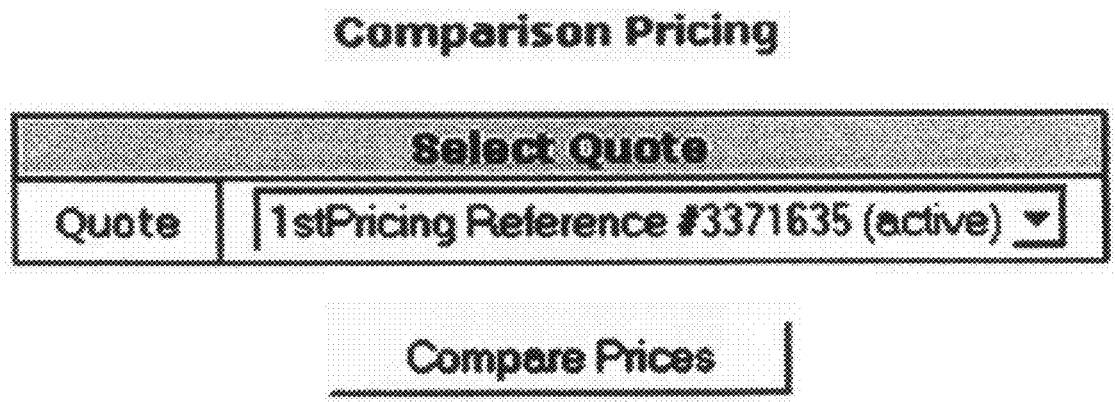
FIG. 27 shows a comparison pricing dialog in the 1stPricing or 1stWindows online database of the present invention that appears when the user clicks on "Compare Prices" in the price quote shown in FIG. 26, and that permits the user to select a particular quote for which comparison pricing for a parametric symbol (construction element) between available manufacturers within a selected zip code will be generated.
Figure 28:
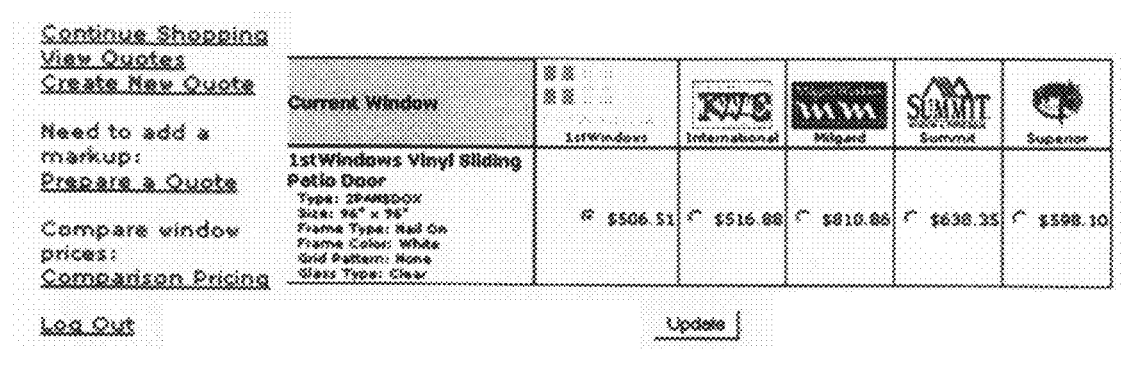

FIGS. 27 and 28

A tremendous advantage of the present invention is an extended option that is present in the online 1stPricing or other designated web site that permits a user to almost instantaneously (generally within no more than about five seconds) comparison shop for price quotes tailored to a particular parametric symbol schedule among two, three, four, five or even ten or more different window, acrylic glass block, door, sky light and/or other manufacturers and/or distributors that manufacture and/or distribute corresponding construction products within the zip code selected by the user, as is discussed hereinabove. This feature very advantageously permits the user to determine the most competitive or "best" "real time" price for each of the different parametric symbols that are described in the price schedule, which can potentially provide a user with a huge savings of money, as well as time spent comparison shopping, and to see a side-by-side comparison of pricing provided by competing manufacturers and/or distributors in all states throughout the United States (i.e., "buy-it-now" pricing at the time of request by the user). The "best" price is a final price that the user can rely on, and that will not change (unless the user makes changes to one or more parametric symbols), which is in stark contrast to an "estimate." As is known by those of skill in the art, a "price" is an assigned amount of money that is required to be paid in order to make a purchase, and an "estimate," in stark contrast, is a rough calculation, an approximation, a judgment or an opinion.

As is shown in FIG. 27, a user can generate a comparison of pricing between available manufacturers/distributors by clicking on "Compare Prices" in the "Comparison Pricing Palette." In addition to prices, manufacturer/distributor information will generally also appear, such as the manufacturer's name, address, phone number, e-mail address and/or the like. For example, the construction product "1stWindows Vinyl Sliding Patio Door" having particular characteristics and configurations selected by a user is described in FIG. 28 (left side). The center and right portions of FIG. 28 show pricing for this particular construction product (patio door) within the zip code selected by the user by five different patio door manufacturers/distributors (1stWindows, International, Milgard, Summit and Superior). Because these prices for the exact same type of patio door vary widely (from $506.51 at 1stWindows to $636.35 at Summit), this feature very advantageously permits the user to choose the patio door manufacturer/distributor for the construction project that has the most competitive or "best" pricing. If the user desires to substitute another patio door manufacturer's/distributor's construction product, the user can simply click on the "Radio" button next to the desired price. The price schedule will then be amended, and the newly selected patio door manufacturer's/distributor's product will then appear in the price schedule.

The prices that are described herein are final prices that may be used to immediately purchase (on line or otherwise) one or more construction plan elements that are present in a construction plan, such as a window and/or door. The online 1stPricing or other designated web site very advantageously permits architects and other users to rapidly create a precise bill of materials with multiple brands, distributors, line item pricing and online purchasing.

Completing the Order and Purchasing the Products—FIGS. 29, 30, 31, 32 and 33

Figure 29:
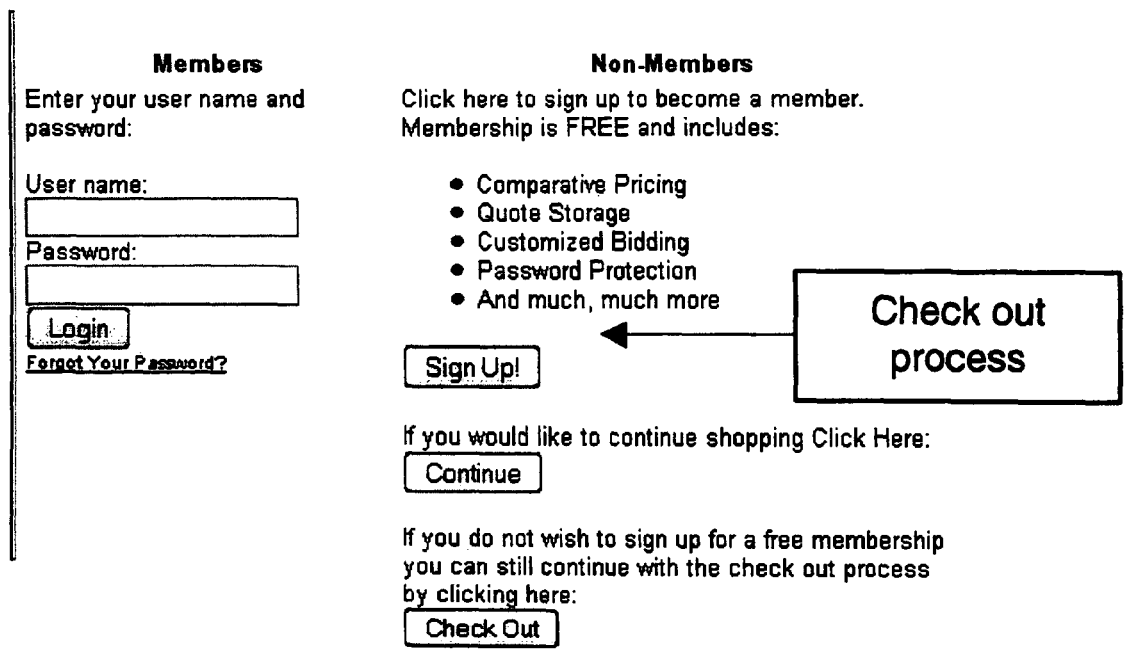
Figure 30:
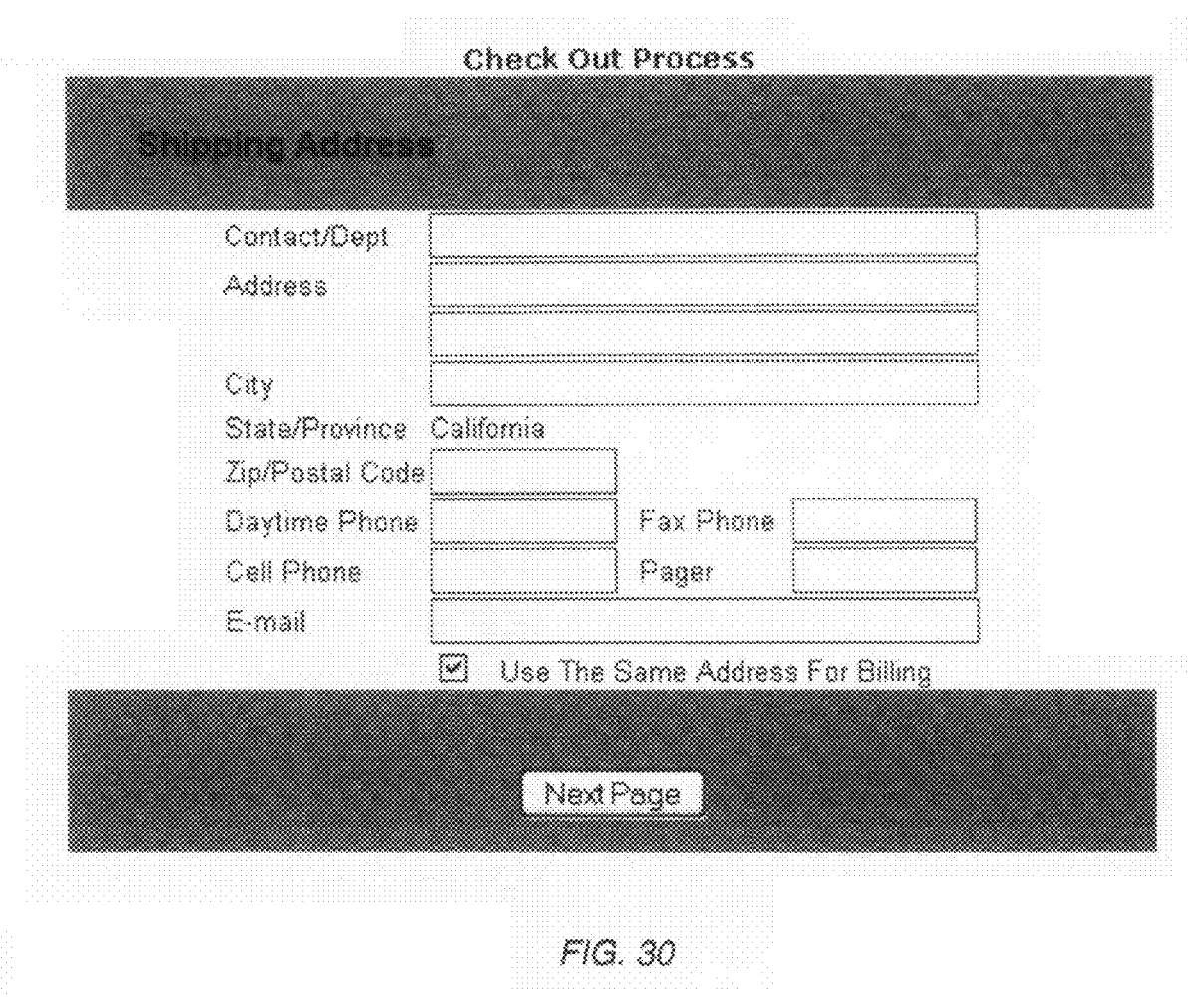

Once a price schedule is completed and verified by the user, the user proceeds to a check out process to purchase the desired construction or other products, such as one or more windows, doors, acrylic glass blocks and/or sky lights. To begin the check out process, the user clicks the "Check Out" button located in the "Check Out" window of the online 1stPricing or other designated web site. If the user either is not a registered user, or is a registered user, but is not logged into the suitable user account, the user will be redirected to a page where the user is given the choice of "Sign Up," "Continue" or "Check Out," which is illustrated in FIG. 29. The user either logs in by inserting the user's User Name and password or, if not a member, just clicks the "Check Out" button at the bottom of a "Non-Member" column located on the Check Out page. In either case, a "Shipping Address" dialog is displayed, as is shown in FIG. 30. The desired shipping information is entered by the user in the fields provided (address, city, state/province, zip postal code, daytime phone, cell phone, e-mail address, facsimile number, pager number and/or the like). If the "Ship to" address and billing address are the same, the user then clicks (checks) the "Use The Same Address For Billing" box. If, however, a separate billing address is required, the user should leave that box unchecked. The user should then click on the "Next Page" button, and a page will be provided on which the user can enter the correct billing address information. When completed, the user should again click on the "Next Page" button.

In a second step of the check out process, payment information is entered in the fields of a dialog provided, as is shown in FIG. 31. The user should then read the "Terms and Conditions of Sales" policy that appears, click the box next to the acceptance policy to check it, and click the "Next Page" button. The 1stPricing online or other designated web site preferably accepts American Express, Visa, MasterCard and Discover Card, and all credit card information is transmitted to this web site via a secure server or "pay on account" and "pay over the phone." The user should then click the "Next Page" button to proceed.

Figure 33:

In a final step before placing an order, all of the inputted information will be displayed on the online 1stPricing or other designated web site in a dialog as is shown in FIG. 32, and should be reviewed closely by the user to ensure the accuracy of this information. Once finished, the user should click the "Submit Order" button, or if changes are needed or desired, the "Change Fields" button. The billing address input by the user typically must match the billing address of the credit card employed in order to ensure a successful transaction. In this manner, the ordering process is completed. An order acknowledgment dialog, as is shown in FIG. 33, will typically then display the order Reference Number, and an e-mail message will typically be sent to the user showing the contents of the user's order. A customer service representative will typically contact the user within 24 to 48 hours to verify all facets of the user's order. Once this step has been completed, the order will be placed, the provided credit card will be charged, and the construction or other products ordered will be manufactured or ordered from a selected distributor, and then shipped to the construction site (or to some other desired location).

Exportation of a Price Schedule

Figure 34:
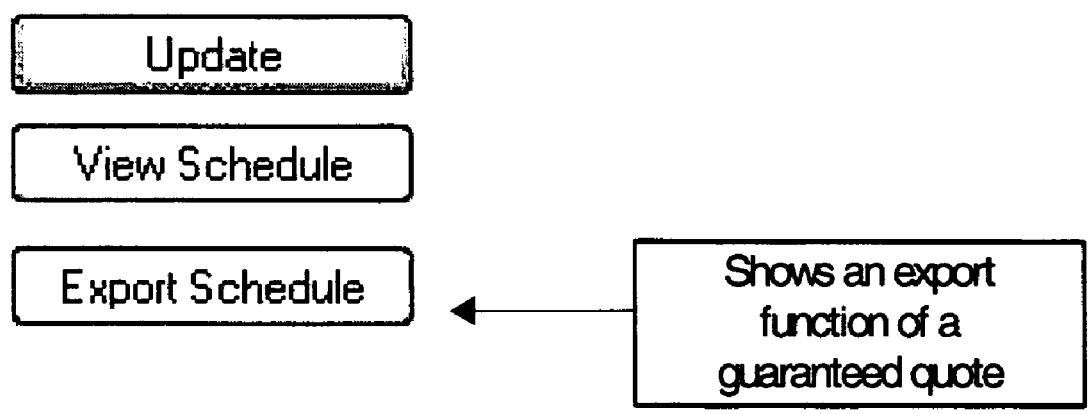

As is shown in FIG. 34, an export function of a generated price schedule in the online 1stPricing or other designated web site online database permits the price schedule to be exported as a standalone object into a database in the form of various common computer applications or formats including, but not limited to, Excel, Word, Plain Text, HTML, XML and/or the like.

Dynamic Product Cart Technology

In contrast with a "Static Product Cart" technology, the present invention is a new "Dynamic Product Cart" technology having the features that are described below.

Characteristics of the "Dynamic Product Cart" Technology

It is not a "standard" (traditional) "off the shelf" type of shopping cart technology that can be purchased commercially for selling standard products. In contrast, it is a "custom" shopping cart technology that has intelligence. ("Off the shelf" shopping cart technology does not know where a user is located at the time of pricing. It prices an object, such as a book, and then asks the user for his address to calculate shipping charges. In contrast, the present invention asks a user for his zip code and then prices one or more products. Product price can be different in every zip code. For example, the price for an identical windows may be more in Beverly Hills, Calif., than in Long Beach. (This is known as "dynamic" pricing.) Then, the shipping cost is calculated.

Its pricing system can perform complex calculations "on the fly" (on demand). With this system, each building material manufacturer/distributor (which generally employs a different method for pricing its products, and product options) can develop a unique pricing scheme that can be programmed into the system. The system can then calculate, for example, square footage pricing, linear footage pricing, perimeter footage pricing, one time fees and/or one time fees based upon an independent variable being added (if then statement) on top of adding the base unit list price for the building material according to zip code.

Pricing glass may be by the square foot, whereas pricing block frame can be by the perimeter foot, or a one time fee, with slope still calculated by length. A user may key in a product type with specific options by, for example, clicking "Add to Cart." The system can then calculate the price on demand. In the case of architectural CAD, a list of options may be sent to a database, with the specifications then being calculated to provide line-item pricing. This "on demand" type pricing permits the pricing of virtually millions of different pricing demands, typically in just seconds. New construction, flush fin, block, windows having slope sill frames and different types of glass, and thicknesses thereof, can be priced in this manner. For example, a $71^{15}/_{16} \times 47^{3}/_{8}$ inch net frame size full casement bay window having paint grade head and seat board, fold down cranks with low E, gray and $3/16"$ thick glass would compute a base list of window size and add the one time fee for the head and seat board, add the one time price for the folding crank handles, add a square footage charge for Low E and gray glass, and then add a $3/16"$ glass thickness square foot charge. Additionally, grids on top window panels only, and windows tempered on the bottom vent only, can be priced. It also permits a user to order "rough opening" size windows (using a stud to stud measurement) in comparison with "net frame size" windows (in which the size that is ordered is the size that is produced).

Shipping costs, as set forth by a manufacturer (a one time fee or a fee that changes as an order increases in size), can be calculated.

It can be used to price products other than windows (alone or in addition to windows), and is not limited to "new construction" and/or "standard size" windows or products. It can provide a price quote for a wide variety of "custom" products.

It can produce a price quote for more than one type of building material, for example, for a kitchen window, a front door and a garage door.

It can produce, or alter, the prices for more than one type of building material, whether the same or different, with more than one feature, for example, a window that has gray glass and Low E glass, and has a glass thickness of $1/4"$, and has a block frame, and measures 8'×4' in size, and has a horizontal grid pattern (one, two, three, four, five or all six of these characteristics).

Comparison pricing of products (i.e. for the same product using a wide variety of different product manufacturers) can be performed.

Items within any zip code region within the United States can be priced.

Zip codes are used.

This technology uses a software design tool.

This technology uses a plug-in (add-on) computer software code.

Architectural parametric symbols are inserted into a construction plan.

A price schedule is created from architectural CAD objects.

As is described hereinabove, the present invention is revolutionary, and solves many of the problems that are associated with previous type devices.

Sources of Materials

All of the materials and equipment that are employed in the methods and systems of the present invention are commercially available from sources that are known by those of ordinary skill in the art.

While the present invention has been described herein with specificity, and with reference to certain preferred embodiments thereof, those of ordinary skill in the art will recognize numerous variations, modifications and substitutions of that which has been described which can be made, and which are within the scope and spirit of the invention. It is intended that all of these modifications and variations be within the scope of the present invention as described and claimed herein, and that the invention be limited only by the scope of the claims which follow, and that such claims be interpreted as broadly as is reasonable.

Throughout this document, various patents, web sites and/or other publications have been cited. The entireties of each of these patents, web sites and other publications are hereby incorporated by reference herein.

What is claimed is:

1. An automated method for creating a price schedule for one or more construction plan elements of a construction project comprising:
   (a) providing on a local computer an architectural software design tool and a construction plan drawing having at least one construction plan element, wherein the construction plan drawing is created with the architectural software design tool;
   (b) providing on the local computer an add-on computer software code that runs as an internal component within the architectural software design tool, and that includes a palette containing one or more parametric symbols, and optionally one or more corresponding parametric symbol values, wherein the palette includes a parametric symbol for each of the construction plan elements;
   (c) selecting one or more of the parametric symbols that is included in the palette for insertion into the construction plan drawing;
   (d) optionally, selecting one or more parametric symbol values for one or more of the selected parametric symbols;
   (e) optionally, selecting one or more types of manufacturers or distributors for one or more of the selected parametric symbols;
   (f) inserting one or more of the selected parametric symbols into the construction plan drawing;
   (g) using the add-on computer software code and an Internet connection, transmitting data corresponding to each of the inserted parametric symbols from the local computer to a remote server system;
   (h) using a zip code, the add-on computer software code and an Internet connection, accessing price data from a web site present on the remote server system that includes price data for a purchase of construction plan elements corresponding to inserted parametric symbols from one or more available manufacturers or distributors in a geographical location within the zip code;
   (i) determining from the price data a price for each of the construction plan elements corresponding to an inserted parametric symbol; and
   (j) using the add-on computer software code, creating a price schedule from the prices, wherein the price schedule includes a total cost for all of the construction plan elements corresponding to inserted parametric symbols, wherein the price schedule can include one or more construction plan elements, and wherein the price schedule may be immediately used on the local computer to place an order to purchase one or more construction plan elements that are present in the price schedule.

2. The method of claim 1 wherein the method comprises an additional step of inserting the price schedule into the construction plan drawing.

3. The method of claim 1 wherein the price schedule contains a list of the construction plan elements corresponding to inserted parametric symbols with corresponding prices.

4. The method of claim 1 wherein the architectural software design tool is a CAD software product.

5. The method of claim 1 wherein the construction plan elements are selected from a group comprising at least one of a window, a door and an acrylic glass block.

6. The method of claim 1 wherein the method comprises an additional step of confirming that each inserted parametric symbol meets criteria of a building code.

7. The method of claim 1 wherein the method comprises an additional step of placing an order to purchase one or more of the construction plan elements that are present in the price schedule.

8. The method of claim 7 wherein the order is placed using the local computer or the web site on the remote server, or both.

9. The method of claim 8 wherein the method comprises an additional step of paying for the order using a credit card and the local computer or the web site on the remote server, or both.

10. The method of claim 2 wherein the method comprises an additional step of placing an order to purchase one or more of the construction plan elements that are present in the price schedule.

11. The method of claim 10 wherein the order is placed using the local computer or the web site on the remote server, or both.

12. The method of claim 11 wherein the method comprises an additional step of paying for the order using a credit card and the local computer or the web site on the remote server, or both.

13. The method of claim 1 wherein the method creates the price schedule including one or two construction plan elements.

14. The method of claim 1 wherein the method creates the price schedule including two or more construction plan elements.

15. The method of claim 1 wherein the construction plan drawing includes one or more walls, and wherein one or more of the inserted parametric symbols automatically aligns with a wall.

16. The method of claim 15 wherein the one or more inserted parametric symbols additionally automatically auto-embeds itself into the wall.

17. The method of claim 1 wherein one or more parametric symbol values are selected.

18. The method of claim 17 wherein one or more of the selected parametric symbol values is modified after a corresponding parametric symbol has been inserted into the construction plan drawing.

19. The method of claim 1 wherein, after the price schedule is created, one or more changes is made to one or more of the inserted parametric symbols, and the price schedule is automatically edited to correspond to the changes.

20. The method of claim 1 wherein the price schedule created is exported into a separate database.

21. The method of claim 1 wherein the web site is an online web site or a remote server system.

22. The method of claim 1 wherein one or more of the prices set forth in the price schedule is selected, and a comparison of prices between two or more available manufacturers for the selected prices is generated.

23. An automated system for creating a price schedule for one or more construction plan elements of a construction project comprising:
   (a) a local computer;
   (b) an architectural software design tool, wherein the architectural software design tool provides on the local computer a construction plan drawing having at least one construction plan element;
   (c) a remote server system having a web site that maintains a database including pricing data for the construction plan elements, wherein an Internet connection exists between the remote server system and the local computer; and
   (d) an add-on computer software code that runs as an internal component within the architectural software design tool on the local computer;
wherein the add-on computer software code has a palette that includes at least one parametric symbol that corresponds with each of the construction plan elements, and that may be selected by a user for insertion into the construction plan drawing; and
wherein the add-on computer software code when executed by the local computer:
   (i) inserts at least one of the parametric symbols that are selected by a user into the construction plan drawing;
   (ii) transmits via the Internet connection data corresponding to each inserted parametric symbol from the local computer to the remote server system;
   (iii) receives via the Internet connection a price for the purchase of each of the construction plan elements corresponding to an inserted parametric symbol from the remote server system, wherein the price may be determined using a zip code and price data that is present on the web site on the remote server system, and corresponds with the purchase of the construction plan elements in a geographical location within the zip code; and
   (iv) generates a price schedule from the prices, wherein the price schedule includes a total cost for all of the construction plan elements corresponding to inserted parametric symbols, wherein the price schedule can include one or more construction plan elements, and wherein the price schedule can be immediately used on the local computer to place an order to purchase one or more construction plan elements that are present in the price schedule.

24. The system of claim 23 wherein the price schedule becomes inserted into the construction plan drawing.

25. The system of claim 23 wherein the price schedule contains a list of the construction plan elements corresponding to inserted parametric symbols with corresponding prices.

26. The system of claim 23 wherein the architectural software design tool is a CAD software product.

27. The system of claim 23 wherein the construction plan elements are selected from a group comprising at least one of a window, a door and an acrylic glass block.

28. The system of claim 23 wherein the add-on computer software code additionally confirms that each inserted parametric symbol meets criteria of a building code.

29. The system of claim 23 wherein the system permits a user to place an order to purchase one or more of the construction plan elements that are present in the price schedule.

30. The system of claim 29 wherein the order is placed using the local computer or the web site on the remote server, or both.

31. The system of claim 30 wherein the system permits a user to pay for the order using a credit card and the local computer or the web site on the remote server, or both.

32. The system of claim 24 wherein the system permits a user to place an order to purchase one or more of the construction plan elements that are present in the price schedule.

33. The system of claim 32 wherein the order is placed using the local computer or the web site on the remote server, or both.

34. The system of claim 33 wherein the system permits a user to pay for the order using a credit card and the local computer or the web site on the remote server, or both.

35. The system of claim 23 wherein the price schedule includes one or two construction plan elements.

36. The system of claim 23 wherein the price schedule includes two or more construction plan elements.

37. The system of claim 23 wherein the construction plan drawing includes one or more walls, and wherein one or more of the inserted parametric symbols automatically aligns with a wall.

38. The system of claim 37 wherein the one or more inserted parametric symbols additionally automatically auto-embeds itself into the wall.

39. The system of claim 23 wherein the system has one or more selected parametric symbol values.

40. The system of claim 39 wherein the system permits one or more of the selected parametric symbol values to be modified after a corresponding parametric symbol is inserted into the construction plan drawing.

41. The system of claim 23 wherein, after the price schedule is created, the system permits one or more changes to be made to one or more of the inserted parametric symbols, and the price schedule to be automatically edited to correspond to the changes.

42. The system of claim 23 wherein the system permits the price schedule created to be exported into a separate database.

43. The system of claim 23 wherein the web site is an online web site or a remote server system.

44. The system of claim 23 wherein the system permits one or more of the prices set forth in the price schedule to be selected, and a comparison of prices between two or more available manufacturers for the selected prices to be generated.

45. An automated method for creating a price schedule for one or more construction plan elements of a construction project comprising:
   (a) providing on a local computer an architectural software design tool and a construction plan drawing having at least one construction plan element, wherein the construction plan drawing is created with the architectural software design tool;
   (b) providing on the local computer an add-on computer software code that runs as an internal component within the architectural software design tool, and that includes a palette containing one or more parametric symbols, and optionally one or more corresponding parametric symbol values, wherein the palette includes at least one parametric symbol that corresponds with a construction plan element;

(c) selecting one or more of the parametric symbols that is included in the palette for insertion into the construction plan drawing;

(d) optionally, selecting one or more parametric symbol values for one or more of the selected parametric symbols;

(e) optionally, selecting one or more types of manufacturers or distributors for one or more of the selected parametric symbols;

(f) inserting one or more of the selected parametric symbols into the construction plan drawing;

(g) using the add-on computer software code, transmitting data corresponding to the inserted parametric symbols from the local computer to a database including price data for a purchase of one or more construction plan elements corresponding to inserted parametric symbols;

(h) using the add-on computer software code, accessing price data from the database;

(i) determining from the price data a price for one or more construction plan elements corresponding to inserted parametric symbols; and (j) using the add-on computer software code, creating a price schedule from the prices, wherein the price schedule may include a total cost for all of the construction plan elements corresponding to inserted parametric symbols, wherein the price schedule can include one or more construction plan elements, and wherein the price schedule may be immediately used on the local computer to place an order to purchase one or more construction plan elements that are present in the price schedule.

46. An automated system for creating a price schedule for one or more construction plan elements of a construction project comprising:

(a) a local computer;

(b) an architectural software design tool, wherein the architectural software design tool provides on the local computer a construction plan drawing having at least one construction plan element;

(c) one or more databases including pricing data for the construction plan elements;

(d) an add-on computer software code that runs as an internal component within the architectural software design tool on the local computer;

wherein the add-on computer software code has a palette that includes at least one parametric symbol that corresponds with a construction plan element, and that may be selected by a user for insertion into the construction plan drawing; and wherein the add-on computer software code when executed by the local computer:

(i) inserts at least one of the parametric symbols that are selected by a user into the construction plan drawing;

(ii) transmits data corresponding to inserted parametric symbols from the local computer to the database;

(iii) receives from the database a price for the purchase of one or more construction plan elements corresponding to inserted parametric symbols, wherein the price may be determined using price data that is present in the database; and (iv) generates a price schedule from the prices, wherein the price schedule may include a total cost for all of the construction plan elements corresponding to inserted parametric symbols, wherein the price schedule can include one or more construction plan elements, and wherein the price schedule can be immediately used on the local computer to place an order to purchase one or more construction plan elements that are present in the price schedule.

47. The method of claim 45 wherein the method may be implemented using an Internet, a LAN, a CD, a DVD or a physical storage medium.

48. The system of claim 46 wherein the system may be implemented using an Internet, a LAN, a CD, a DVD or a physical storage medium.

49. The method of claim 45 wherein the method may be implemented using an Internet, a LAN, a CD or a DVD.

50. The system of claim 46 wherein the system may be implemented using an Internet, a LAN, a CD or a DVD.

51. The method of claim 45 wherein the schedule additionally includes a reference number.

52. The system of claim 46 wherein the schedule additionally includes a reference number.

* * * * *